US010751989B2

(12) United States Patent
Gregor et al.

(10) Patent No.: US 10,751,989 B2
(45) Date of Patent: Aug. 25, 2020

(54) ROLL TAKE-UP DEVICE WITH AN ELECTRICAL CONTACT FOR A ROLL OF A SHEETLIKE COMPOSITE FOR PRODUCING DIMENSIONALLY STABLE FOOD AND DRINK CONTAINERS

(71) Applicant: SIG TECHNOLOGY AG, Neuhasen am Rheinfall (CH)

(72) Inventors: Peter Gregor, Saalfelden (AT); Dirk Schibull, Hückelhoven Baal (DE); Hannes Peßenteiner, Saalfelden (AT); Norbert Herzog, Saalfelden (AT)

(73) Assignee: SIG TECHNOLOGY AG, Neuhasen am Rheinfall (CH)

( * ) Notice: Subject to any disclaimer, the term of this patent is extended or adjusted under 35 U.S.C. 154(b) by 0 days.

(21) Appl. No.: 16/338,588

(22) PCT Filed: Sep. 28, 2017

(86) PCT No.: PCT/EP2017/074625
§ 371 (c)(1),
(2) Date: Apr. 1, 2019

(87) PCT Pub. No.: WO2018/060330
PCT Pub. Date: Apr. 5, 2018

(65) Prior Publication Data
US 2020/0039205 A1 Feb. 6, 2020

(30) Foreign Application Priority Data
Sep. 30, 2016 (DE) .................... 10 2016 219 119

(51) Int. Cl.
*B41F 17/00* (2006.01)
*B32B 7/12* (2006.01)
(Continued)

(52) U.S. Cl.
CPC ............... *B41F 17/00* (2013.01); *B32B 7/12* (2013.01); *B32B 15/20* (2013.01); *B32B 27/10* (2013.01); *B32B 27/32* (2013.01)

(58) Field of Classification Search
CPC . B41F 17/00; B32B 7/12; B32B 15/20; B32B 27/10; B32B 27/32
See application file for complete search history.

(56) References Cited

U.S. PATENT DOCUMENTS

2013/0138287 A1  5/2013  Brenneke et al.
2017/0157885 A1  6/2017  Ochsmann et al.

FOREIGN PATENT DOCUMENTS

DE  10312384 B3  6/2004
DE  102014010016 A1  1/2016
(Continued)

OTHER PUBLICATIONS

International Search Report and Written Opinion, issued in international application No. PCT/EP2017/074625 dated Jan. 2, 2018.

*Primary Examiner* — Michael C Miggins
(74) *Attorney, Agent, or Firm* — Meunier Carlin & Curfman LLC

(57) ABSTRACT

The invention relates to a roll take-up device (110) designed for • a) taking up a sheetlike composite (101), and • b) rolling up or unrolling or both rolling up and unrolling a roll (102) of the sheetlike composite (101); • i) a carrier layer (304), • ii) a barrier layer (306) and • iii) an inner polymer layer (308); wherein, in the roll (102), at least 10 laminas of the sheetlike composite (101) are overlaid on one another from the inside outwards or vice versa; wherein the laminas respectively have the series of layers (304, 306, 308); wherein one layer (306) of the series of layers of the sheetlike composite (101) is an electrically conductive layer.

20 Claims, 12 Drawing Sheets

Figure 1:
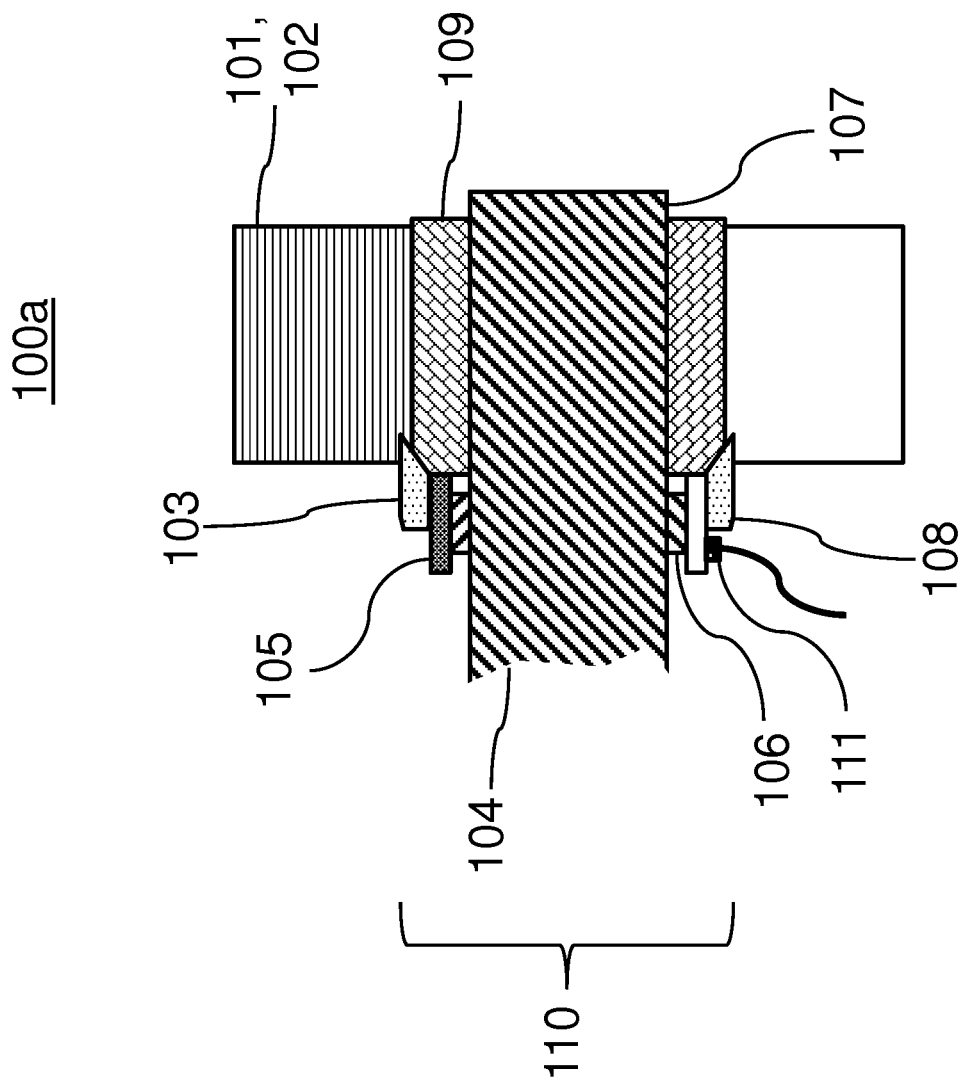

(51) Int. Cl.
*B32B 15/20* (2006.01)
*B32B 27/10* (2006.01)
*B32B 27/32* (2006.01)

(56) References Cited

FOREIGN PATENT DOCUMENTS

| | | |
|---|---|---|
| EP | 1164085 A1 | 12/2001 |
| EP | 1507660 A1 | 2/2005 |
| GB | 1159923 A | 7/1969 |
| WO | 90/09926 A2 | 9/1990 |
| WO | 2012/019661 A1 | 2/2012 |

ROLL TAKE-UP DEVICE WITH AN ELECTRICAL CONTACT FOR A ROLL OF A SHEETLIKE COMPOSITE FOR PRODUCING DIMENSIONALLY STABLE FOOD AND DRINK CONTAINERS

The invention relates to a roll take-up device designed for
a) taking up a sheetlike composite, and
b) rolling up or unrolling or both rolling up and unrolling a roll of the sheetlike composite;
wherein the sheetlike composite comprises, as layers of a series of layers in a direction from an outer side of the sheetlike composite to an inner side of the sheetlike composite,
  i) a carrier layer,
  ii) a barrier layer, and
  iii) an inner polymer layer;
wherein, in the roll, at least 10 laminas of the sheetlike composite are overlaid on one another from the inside outwards or vice versa; wherein the laminas respectively have the series of layers; wherein one layer of the series of layers of the sheetlike composite is an electrically conductive layer; characterized in that the roll take-up device comprises an electrical contact, which is arranged and designed for contacting the electrically conductive layer in an electrically conducting manner. The invention also relates to an apparatus comprising a roll take-up device, a sheetlike composite and a contacting means; a printing apparatus; a process, comprising taking up a sheetlike composite by a first roll take-up device; and also uses of the roll take-up device and a tensioning means.

For some time, food and drink products, whether they be food and drink products for human consumption or else animal feed products, have been preserved by storing them either in a can or in a jar closed by a lid. In this case, the shelf life can be increased firstly by sterilizing the food or drink product and the container, here the jar or can, separately and to the greatest possible extent in each case, and then introducing the food or drink product into the container and closing the container. However, these measures for increasing the shelf life of food and drink products, which have been tried and tested over a long period, have a series of disadvantages, for example the need for another sterilization later on. Cans and jars, because of their essentially cylindrical shape, have the disadvantage that very dense and space-saving storage is not possible. Moreover, cans and jars have considerable intrinsic weight, which leads to increased energy expenditure in transport. In addition, production of glass, tinplate or aluminium, even when the raw materials used for the purpose are recycled, necessitates quite a high expenditure of energy. In the case of jars, an additional aggravating factor is elevated expenditure on transport. The jars are usually prefabricated in a glass factory and then have to be transported to the facility where the food and drink products are dispensed with the use of considerable transport volumes. Furthermore, jars and cans can be opened only with considerable expenditure of force or with the aid of tools and hence in a rather laborious manner. In the case of cans, there is a high risk of injury arising from sharp edges that occur on opening. In the case of jars, there are recurrent instances of broken glass getting into the food or drink product in the course of filling or opening of the filled jars, which in the worst case can lead to internal injuries when the food or drink product is consumed. In addition, both cans and jars have to be labelled with labels for identification and promotion of the food or drink product contents. The jars and cans cannot readily be printed directly with information and promotional messages. In addition to the actual printing, a substrate for the purpose, a paper or suitable film, is thus needed, as is a securing means, an adhesive or a sealant.

Other packaging systems for storing food and drink products over a long period with minimum impairment are known from the prior art. These are containers produced from sheetlike composites—frequently also referred to as laminates. Sheetlike composites of this kind are frequently constructed from a thermoplastic polymer layer, a carrier layer usually consisting of cardboard or paper which imparts dimensional stability to the container, an adhesion promoter layer, a barrier layer and a further polymer layer, as disclosed inter alia in WO 90/09926 A2. Since the carrier layer imparts dimensional stability to the container manufactured from the laminate, these containers, by contrast with film bags, can be regarded as a further development of the aforementioned jars and cans. As compared with the latter, the laminate containers already have many advantages. For instance, instead of having labels adhesively attached, these containers are typically provided with printed images or colour decorations, which apart from providing information about the content of the containers are also intended to evoke important aesthetic impressions for the end user of the food and drink products located in the containers.

The above laminates are usually produced in long webs and rolled up on a tube to form a roll. The rolls thus obtained can be transported to further processing facilities or else stored. Here it is often the case that a number of webs of the laminate are rolled up one after the other onto a common tube to form a roll. In this case, the webs are for example adhesively joined to one another in a transitional region. In this way, the rolls can always be produced with a constant size and weight, irrespective of the length of web of the starting material, which is sometimes provided as a finite web. The latter applies especially to a carrier layer of cardboard or paper. The aforementioned adhesive join represents a defect of the laminate that has to be taken into account in the further processing. This applies for example to the further processing of the laminate roll to form filled food or drink containers in the filling machine in the case of the so-called roll-fed process. In the case of this process, the laminate is unrolled from the roll and formed continuously into a structure in the form of a tubular film, which is filled portion by portion with the food or drink product before filled containers are individually separated from the tubular film. To avoid processing problems and the production of scrap, and also to avoid wasting the food or drink product, the tubular film should not include any adhesive join. It is consequently advantageous to be able to coordinate the forming of the tubular film with the presence and position of adhesive joins in the laminate roll. In the wraparound-sleeve process for producing filled food or drink product containers as an alternative to the roll-fed process, the printing with the colour decoration is performed onto the previously produced multilayered laminate. Here, too, the presence and position of adhesive joins may be significant. Thus, for example, the use of suitable print-assisting measures for improving the print quality of the colour decoration should be coordinated with whether the laminate roll to be printed on contains one or even more than one defect and where it or they occur in the roll. It should also be avoided that laminate sleeves that contain regions of an adhesive join are produced. Such sleeves must be manually segregated as scrap. It is consequently particularly advisable in terms of an economic process not to produce any such sleeves in the first place, and this can only succeed if the adhesive join is detected as automatically as possible before the sleeves are individually separated from the laminate web. Irrespective of the basic type of design of the process for producing and filling food or drink product containers as a roll-fed process or a wraparound-sleeve process, there is a need for being able to print onto the laminate with printheads, for example inkjet printheads. In the case of such printing, the distance between the printhead and the laminate is typically of the order of magnitude of 1 mm. If the laminate web to be printed onto has an adhesive join, this represents a considerable thickening of the laminate. If this thickening remains undetected before the printhead, the printhead may be damaged. Accordingly, the adhesive join should be automatically detected, and suitable measures for protecting the printhead taken, before the printhead. Consequently, for both industrially widespread and commercially significant processes for producing filled, dimensionally stable food or drink product containers from laminates, there is a need for a detection of defects in a laminate roll that is as simple as possible and automated.

In general terms, it is an object of the present invention to at least partly overcome a disadvantage that arises from the prior art. A further object of the invention is to provide an apparatus and a process for detecting defects in a rolled-up laminate for the production of dimensionally stable food or drink product containers. The detection is preferably possible here in situ, during the production of the containers, especially during printing of the laminate with a colour decoration for the container. The production of the containers can also preferably take place here with the highest possible speed. Moreover, it is preferably possible for the detection to be automated and integrated in the production of the containers. It is also an object of the invention to provide an apparatus and a process that allow the print quality of a colour decoration of a dimensionally stable food or drink product container to be improved, especially by the specific use of print-assisting measures. The improvement may preferably be achieved here by a process that is as safe as possible. It is also an object of the invention to provide an apparatus and a process that allow a reduction of processing problems and/or a reduction of the production of scrap during production of filled, dimensionally stable food or drink product containers. It is also an object of the invention to provide an apparatus and a process that allow a laminate for the production of dimensionally stable food or drink product containers to be printed with a printhead, especially that allow the printhead to be protected here from damage. The process speed and the productivity of the process remain as high as possible here.

A contribution to the at least partial achievement of at least one of the above objects is made by the independent claims. The dependent claims provide preferred embodiments which contribute to the at least partial achievement of at least one of the objects.

A contribution to the achievement of at least one of the objects of the invention is made by an embodiment 1 of a roll take-up device designed for
 a) taking up a sheetlike composite, and
 b) rolling up or unrolling or both rolling up and unrolling a roll of the sheetlike composite;
  wherein the sheetlike composite comprises, as layers of a series of layers in a direction from an outer side of the sheetlike composite to an inner side of the sheetlike composite,
  i) a carrier layer,
  ii) a barrier layer, and
  iii) an inner polymer layer;
wherein, in the roll, at least 10, preferably at least 50, more preferably at least 100, most preferably at least 500, laminas of the sheetlike composite are overlaid on one another from the inside outwards or vice versa; wherein the laminas respectively have the series of layers; wherein one layer of the series of layers of the sheetlike composite is an electrically conductive layer; characterized in that the roll take-up device comprises an electrical contact, which is arranged and designed for contacting the electrically conductive layer in an electrically conducting manner. If the taking-up of the sheetlike composite takes the form of a rolling up of the sheetlike composite to form the roll, then the outer side of the sheetlike composite is preferably facing inwards in the roll. If the taking-up of the sheetlike composite takes the form of a mounting of the roll, then the outer side of the sheetlike composite is preferably facing outwards in the roll.

In an embodiment 2 according to the invention, the roll take-up device is configured according to embodiment 1, wherein the electrical contact is arranged and designed for contacting the electrically conductive layer in an electrically conducting manner during the take-up. Preferably, the electrically conductive layer is automatically contacted in an electrically conducting manner during the take-up.

In an embodiment 3 according to the invention, the roll take-up device is configured according to embodiment 1 or 2, wherein the electrically conductive layer does not include the outer side or the inner side or both.

In an embodiment 4 according to the invention, the roll take-up device is configured according to one of the preceding embodiments, wherein the electrical contact is arranged and designed such that, for contacting the electrically conductive layer in an electrically conducting manner, it at least partially cuts or perforates or both cuts and perforates at least one lamina, preferably at least 2 laminas, more preferably at least 3 laminas, most preferably at least 4 laminas, of the sheetlike composite. Preferably, the at least one lamina is an innermost lamina of the roll. Further preferably, the electrical contact cuts or perforates or both cuts and perforates no more than 4, more preferably no more than 3, most preferably no more than 2, laminas of the sheetlike composite.

In an embodiment 5 according to the invention, the roll take-up device is configured according to one of the preceding embodiments, wherein the electrical contact comprises at least one cutting edge, preferably at least 2 cutting edges, more preferably at least 3 cutting edges, more preferably at least 4 cutting edges, more preferably at least 5 cutting edges, most preferably at least 6 cutting edges.

In an embodiment 6 according to the invention, the roll take-up device is configured according to one of the preceding embodiments, wherein the roll take-up device comprises a tensioning means or a rotation shaft or both; wherein the tensioning means or the rotation shaft or both is/are designed for
 a) taking up the sheetlike composite, and
 b) rolling up or unrolling or both rolling up and unrolling the roll of the sheetlike composite;
wherein the tensioning means or the rotation shaft or both include(s) a lateral surface and the electrical contact. A preferred tensioning means is one selected from the group consisting of a tensioning cone, a tensioning shaft and a tensioning mandrel or a combination of at least two thereof. A preferred lateral surface is a cone lateral surface, a mandrel lateral surface or a shaft lateral surface or a combination of at least two thereof.

In an embodiment 7 according to the invention, the roll take-up device is configured according to embodiment 6, wherein the cutting edge has a first length, wherein the cutting edge runs over at least 50%, preferably at least 70%, more preferably at least 90%, of the first length in an axial direction of the lateral surface.

In an embodiment 8 according to the invention, the roll take-up device is configured according to embodiment 6 or 7, wherein the electrical contact comprises at least one further cutting edge, wherein the further cutting edge has a further length, wherein the further cutting edge runs over at least 50%, preferably at least 70%, more preferably at least 90%, of the further length in a further direction, wherein the further direction has a component in a radial direction of the lateral surface. Preferably, the further direction also has a further component in the axial direction of the lateral surface. Preferably, in the radial direction, the further cutting edge is arranged closer to a longitudinal axis of the tensioning means or of the rotation shaft or both than the cutting edge. Preferably, the further cutting edge is arranged and designed for cutting into a roll substrate in the axial direction of the lateral surface. A preferred roll substrate is a tube. A preferred tube consists of paperboard or cardboard or both.

In an embodiment 9 according to the invention, the roll take-up device is configured according to one of the preceding embodiments, wherein the electrical contact consists of a steel, wherein the steel contains nickel in a range from 3.5 to 4.5% by weight, preferably from 3.6 to 4.4% by weight, more preferably from 3.7 to 4.3% by weight, most preferably from 3.8 to 4.2% by weight, based in each case on the weight of the steel.

In an embodiment 10 according to the invention, the roll take-up device is configured according to one of the preceding embodiments, wherein the electrical contact consists of a steel, wherein the steel comprises one selected from the group consisting of
  a) carbon in a range from 0.4 to 0.5% by weight, preferably from 0.41 to 0.49% by weight, more preferably from 0.42 to 0.48% by weight, most preferably from 0.43 to 0.47% by weight, based in each case on the weight of the steel,
  b) chromium in a range from 1.2 to 1.5% by weight, preferably from 1.24 to 1.46% by weight, more preferably from 1.28 to 1.4% by weight, most preferably from 1.3 to 1.38% by weight, based in each case on the weight of the steel, and
  c) molybdenum in a range from 0.17 to 0.33% by weight, preferably from 0.19 to 0.31% by weight, more preferably from 0.2 to 0.3% by weight, most preferably from 0.22 to 0.228% by weight, based in each case on the weight of the steel,
  d) or a combination of at least two of a) to c), preferably all of a) to c).

An especially preferred steel has the material number 1.2767 according to EN ISO 4957:2000. Further preferably, the electrical contact consists of a steel with a Brinell hardness in a range from 230 to 310 HBW, preferably from 240 to 300 HBW, more preferably from 250 to 295 HBW, most preferably from 260 to 290 HBW, in each case according to EN ISO 6506-1 to 4:2015-02.

In an embodiment 11 according to the invention, the roll take-up device is configured according to one of the preceding embodiments, wherein the take-up is a rolling up of the sheetlike composite to form the roll. Preferably, the outer side of the sheetlike composite faces inwards in the roll.

In an embodiment 12 according to the invention, the roll take-up device is configured according to embodiment 11, wherein the rolling up comprises an overlaying of the lateral surface with the laminas of the sheetlike composite, wherein the sheetlike composite is contacted by the cutting edge during the overlaying.

In an embodiment 13 according to the invention, the roll take-up device is configured according to one of embodiments 6 to 12, wherein the roll take-up device also comprises a carrier element, wherein the carrier element
  a) at least partially surrounds the lateral surface along a circumference of the lateral surface, and
  b) is electrically insulated from the lateral surface,
wherein the electrical contact is fixed on the carrier element. For this purpose, the electrical contact may for example be connected to the carrier element by a fastening means. A preferred fastening means is a screw. A preferred carrier element is formed as a ring. Further preferably, the carrier element is electrically conducting.

In an embodiment 14 according to the invention, the roll take-up device is configured according to one of embodiments 6 to 13, wherein the roll take-up device comprises at least one further electrical contact, preferably 2 further electrical contacts, most preferably 3 further electrical contacts, wherein the electrical contact and the further electrical contact are arranged distributed along a circumference of the lateral surface, preferably distributed equidistantly.

In an embodiment 15 according to the invention, the roll take-up device is configured according to one of embodiments 5 to 13, wherein the cutting edge in a projection onto the lateral surface forms an angle of less than 30°, preferably of less than 20°, more preferably less than 10°, most preferably less than 5°, with a longitudinal axis of the lateral surface.

In an embodiment 16 according to the invention, the roll take-up device is configured according to one of the preceding embodiments, wherein the electrical contact or the further electrical contact or both is/are formed in one piece.

In an embodiment 17 according to the invention, the roll take-up device is configured according to one of embodiments 6 to 16, wherein the electrical contact comprises a block, which on a side facing away from the lateral surface comprises a multiplicity of webs each with a cutting edge. Here, the electrical contact preferably has at least 2, more preferably at least 3, more preferably at least 4, more preferably at least 5, most preferably at least 6, webs.

In an embodiment 18 according to the invention, the roll take-up device is configured according to one of the preceding embodiments, wherein the taking-up takes the form of a mounting of the roll.

In an embodiment 19 according to the invention, the roll take-up device is configured according to embodiment 18, wherein the electrical contact comprises a cutting means, wherein the cutting means is arranged and designed such that, in the take-up, the cutting means bumps into the roll in an axial direction of the roll and thereby at least partially cuts at least one lamina of the sheetlike composite in a radial direction of the roll or in an axial direction of the roll or both. Preferably, the cutting means comprises the cutting edge.

In an embodiment 20 according to the invention, the roll take-up device is configured according to one of the preceding embodiments, wherein the sheetlike composite also comprises an outer polymer layer, wherein the outer polymer layer is overlaid on the carrier layer on a side of the carrier layer that is facing away from the barrier layer. A preferred outer polymer layer comprises an LDPE to an extent of at least 50% by weight, preferably to an extent of at least 60% by weight, more preferably to an extent of at least 70% by weight, still more preferably to an extent of at least 80% by weight, most preferably to an extent of at least 90% by weight, based in each case on the weight of the outer polymer layer.

In an embodiment 21 according to the invention, the roll take-up device is configured according to one of the preceding embodiments, wherein the inner polymer layer comprises a polymer produced by means of a metallocene catalyst to an extent of 10 to 90% by weight, preferably to an extent of 25 to 90% by weight, more preferably to an extent of 30 to 80% by weight, based in each case on the total weight of the inner polymer layer. In a further preferred embodiment, the inner polymer layer comprises a polymer blend, wherein the polymer blend comprises an mPE to an extent of 10 to 90% by weight, preferably to an extent of 25 to 90% by weight, more preferably to an extent of 30 to 80% by weight, and a further polymer to an extent of at least 10% by weight, preferably to an extent of at least 15% by weight, more preferably to an extent of at least 20% by weight, based in each case on the total weight of the polymer blend.

In an embodiment 22 according to the invention, the roll take-up device is configured according to one of the preceding embodiments, wherein the carrier layer, preferably the outer polymer layer, is overlaid with an ink application, preferably a decoration, on a side of the carrier layer, preferably of the outer polymer layer, that is facing away from the barrier layer. The ink application preferably comprises at least one colourant.

In an embodiment 23 according to the invention, the roll take-up device is configured according to one of the preceding embodiments, wherein the carrier layer comprises one selected from the group consisting of cardboard, paperboard and paper, or a combination of at least two thereof.

In an embodiment 24 according to the invention, the roll take-up device is configured according to one of the preceding embodiments, wherein the barrier layer is the electrically conductive layer.

In an embodiment 25 according to the invention, the roll take-up device is configured according to one of the preceding embodiments, wherein the barrier layer comprises a metal, preferably consists thereof. A preferred metal is aluminium.

A contribution to the achievement of at least one of the objects of the invention is made by an embodiment 1 of an apparatus, comprising
 a) a roll take-up device,
 b) a sheetlike composite and
 c) a contacting means;
wherein the sheetlike composite comprises, as layers of a series of layers in a direction from an outer side of the sheetlike composite to an inner side of the sheetlike composite,
 a. a carrier layer,
 b. a barrier layer and
 c. an inner polymer layer;
wherein the sheetlike composite is at least partially rolled up to form a roll; wherein the roll is held by the roll take-up device; wherein at least 10, preferably at least 50, more preferably at least 100, most preferably at least 500, laminas of the sheetlike composite are overlaid on one another from the inside to the outside or vice versa; wherein the laminas respectively have the series of layers; wherein one layer of the series of layers of the sheetlike composite is an electrically conductive layer; wherein the contacting means is contacted with the electrically conductive layer in an electrically conducting manner.

In an embodiment 2 according to the invention, the apparatus is configured according to embodiment 1, wherein the electrically conductive layer does not include the outer side or the inner side or both.

In an embodiment 3 according to the invention, the apparatus is configured according to embodiment 1 or 2, wherein the contacting means comprises an electrical contact, wherein, preferably for contacting the electrically conductive layer in an electrically conducting manner, the electrical contact at least partially cuts or perforates or both cuts and perforates at least one lamina, preferably at least 2 laminas, more preferably at least 3 laminas, most preferably at least 4 laminas, of the sheetlike composite. Preferably, the at least one lamina is an innermost lamina of the roll. Further preferably, the electrical contact cuts or perforates or both cuts and perforates no more than 5, more preferably no more than 4, most preferably no more than 3, laminas of the sheetlike composite.

In an embodiment 4 according to the invention, the apparatus is configured according to one of embodiments 1 to 3, wherein the contacting means comprises an electrical contact, wherein the electrical contact comprises at least one cutting edge, preferably at least 2 cutting edges, more preferably at least 3 cutting edges, more preferably at least 4 cutting edges, more preferably at least 5 cutting edges, most preferably at least 6 cutting edges.

In an embodiment 5 according to the invention, the apparatus is configured according to one of embodiments 1 to 4, wherein the roll take-up device comprises a tensioning means or a rotation shaft or both, wherein the tensioning means or the rotation shaft or both comprise(s) a lateral surface. Preferably, the tensioning means or the rotation shaft or both also comprise(s) the electrical contact.

In an embodiment 6 according to the invention, the apparatus is configured according to embodiment 5, wherein the roll take-up device also comprises a carrier element, wherein the carrier element
 a) at least partially surrounds the lateral surface along a circumference of the lateral surface, and
 b) is electrically insulated from the lateral surface;
wherein the electrical contact is fixed on the carrier element.

In an embodiment 7 according to the invention, the apparatus is configured according to embodiment 6, wherein the contacting means also comprises a sliding contact, wherein the sliding contact contacts the carrier element in an electrically conducting manner. A preferred sliding contact comprises, preferably consists of, graphite. A sliding contact consisting of graphite is also known as a carbon brush, a carbon pin or a collector. A further preferred sliding contact consists of metal.

In an embodiment 8 according to the invention, the apparatus is configured according to one of embodiments 4 to 7, wherein the cutting edge has a first length, wherein the cutting edge runs over at least 50%, preferably at least 70%, more preferably at least 90%, of the first length in an axial direction of the lateral surface.

In an embodiment 9 according to the invention, the apparatus is configured according to one of embodiments 4 to 8, wherein the electrical contact comprises at least one further cutting edge, wherein the further cutting edge has a further length, wherein the further cutting edge runs over at least 50%, preferably at least 70%, more preferably at least 90%, of the further length in a further direction, wherein the further direction has a component in a radial direction of the lateral surface.

In an embodiment 10 according to the invention, the apparatus is configured according to one of embodiments 1 to 9, wherein the contacting means comprises an electrical contact, wherein the electrical contact consists of a steel, wherein the steel contains nickel in a range from 3.5 to 4.5% by weight, preferably from 3.6 to 4.4% by weight, more preferably from 3.7 to 4.3% by weight, most preferably from 3.8 to 4.2% by weight, based in each case on the weight of the steel.

In an embodiment 11 according to the invention, the apparatus is configured according to one of embodiments 1 to 10, wherein the contacting means comprises an electrical contact, wherein the electrical contact consists of a steel, wherein the steel comprises one selected from the group consisting of
 a) carbon in a range from 0.4 to 0.5% by weight, preferably from 0.41 to 0.49% by weight, more preferably from 0.42 to 0.48% by weight, most preferably from 0.43 to 0.47% by weight, based in each case on the weight of the steel,
 b) chromium in a range from 1.2 to 1.5% by weight, preferably from 1.24 to 1.46% by weight, more preferably from 1.28 to 1.4% by weight, most preferably from 1.3 to 1.38% by weight, based in each case on the weight of the steel, and
 c) molybdenum in a range from 0.17 to 0.33% by weight, preferably from 0.19 to 0.31% by weight, more preferably from 0.2 to 0.3% by weight, most preferably from 0.22 to 0.228% by weight, based in each case on the weight of the steel,
 d) or a combination of at least two of a) to c), preferably all of a) to c).

An especially preferred steel has the material number 1.2767 according to EN ISO 4957:2000. Further preferably, the electrical contact consists of a steel with a Brinell hardness in a range from 230 to 310 HBW, preferably from 240 to 300 HBW, more preferably from 250 to 295 HBW, most preferably from 260 to 290 HBW, in each case according to EN ISO 6506-1 to 4:2015-02.

In an embodiment 12 according to the invention, the apparatus is configured according to one of embodiments 4 to 11, wherein the cutting edge in a projection onto the lateral surface forms an angle of less than 30°, preferably of less than 20°, more preferably less than 10°, most preferably less than 5°, with a longitudinal axis of the lateral surface.

In an embodiment 13 according to the invention, the apparatus is configured according to one of embodiments 4 to 12, wherein a height of the cutting edge above the lateral surface decreases in an axial direction of the roll towards an axial centre of the roll.

In an embodiment 14 according to the invention, the apparatus is configured according to one of embodiments 4 to 13, wherein the contacting means comprises at least one further electrical contact, preferably 2 further electrical contacts, most preferably 3 further electrical contacts, wherein the electrical contact and the further electrical contact are arranged distributed along the circumference of the lateral surface, preferably distributed equidistantly.

In an embodiment 15 according to the invention, the apparatus is configured according to one of embodiments 3 to 14, wherein the electrical contact or the further electrical contact or both is/are formed in one piece.

In an embodiment 16 according to the invention, the apparatus is configured according to one of embodiments 3 to 15, wherein the electrical contact comprises a block, which on a side facing away from the lateral surface comprises a multiplicity of webs each with a cutting edge. Here, the electrical contact preferably has at least 2, more preferably at least 3, more preferably at least 4, more preferably at least 5, most preferably at least 6, webs.

In an embodiment 17 according to the invention, the apparatus is configured according to one of embodiments 3 to 16, wherein the electrical contact comprises a cutting means, wherein the cutting means is pushed into the roll in an axial direction of the roll and at least partially cuts at least one lamina of the sheetlike composite in a radial direction of the roll or in an axial direction of the roll or both.

In an embodiment 18 according to the invention, the apparatus is configured according to one of embodiments 1 to 17, wherein the apparatus also comprises a motor, wherein the motor is arranged and designed for driving the roll take-up device.

In an embodiment 19 according to the invention, the apparatus is configured according to one of embodiments 1 to 18, wherein the barrier layer is the electrically conductive layer.

In an embodiment 20 according to the invention, the apparatus is configured according to one of embodiments 1 to 19, wherein the barrier layer comprises a metal.

A contribution to the achievement of at least one of the objects of the invention is made by an embodiment 1 of a printing apparatus comprising
 a) a first printing unit, comprising a first printing roller and a first impression roller,
 b) a sheetlike composite,
 c) a first contacting means,
wherein the sheetlike composite
 A) comprises, as layers of a series of layers in a direction from an outer side of the sheetlike composite to an inner side of the sheetlike composite,
  i) a carrier layer,
  ii) a barrier layer and
  iii) an inner polymer layer;
and
 B) is partly made to extend between the first printing roller and the first impression roller,
wherein one layer of the series of layers of the sheetlike composite is an electrically conductive layer, characterized in that the first contacting means contacts the electrically conductive layer in an electrically conducting manner. Preferably, the printing unit comprises at least one further printing unit, preferably at least 2 further printing units, more preferably at least 3 further printing units, more preferably at least 4 further printing units, most preferably at least 6 further printing units, wherein each further printing unit respectively comprises a further printing roller and a further impression roller, wherein the sheetlike composite is in each case made to extend between the further printing rollers and the further impression rollers. Preferably, the further printing units are arranged after the first printing unit in a printing direction. Preferably, the sheetlike composite is partly made to extend between the first printing roller and the first impression roller such that the outer side of the sheetlike composite is facing the first printing roller and the inner side of the sheetlike composite is facing the first impression roller. Preferably, the first contacting means is designed like the contacting means according to an embodiment of the roll take-up device according to the invention or of the apparatus according to the invention.

In an embodiment 2 according to the invention, the printing apparatus is configured according to embodiment 1, wherein the electrically conductive layer does not include the outer side or the inner side or both.

In an embodiment 3 according to the invention, the printing apparatus is configured according to embodiment 1 or 2, wherein the barrier layer is the electrically conductive layer.

In an embodiment 4 according to the invention, the printing apparatus is configured according to one of embodiments 1 to 3, wherein the printing apparatus also comprises
  a) a first roll take-up device, and
  b) a further roll take-up device;
wherein the first roll take-up device
  a. is arranged before the first printing unit in a printing direction,
  b. is designed for taking up a first roll of the sheetlike composite, and
  c. is designed for unrolling the first roll of the sheetlike composite;
wherein the further roll take-up device
  A) is arranged after the first printing unit in a printing direction, and
  B) is designed for rolling up the sheetlike composite to form a further roll;
wherein, in the first roll and in the further roll, in each case at least 10, preferably at least 50, more preferably at least 100, most preferably at least 500, laminas of the sheetlike composite are overlaid on one another from the inside outwards or vice versa; wherein the laminas respectively have the series of layers; wherein the first contacting means electrically contacts the electrically conductive layer in a lamina of the sheetlike composite that is held by the first roll take-up device or the further roll take-up device. Preferably, the further roll take-up device is arranged after the further printing unit(s) in the printing direction. Preferably, the first roll take-up device or the further roll take-up device or both are respectively designed according to one of embodiments 1 to 25 of the roll take-up device according to the invention. Here, the first contacting means preferably comprises the electrical contact.

In an embodiment 5 according to the invention, the printing apparatus is configured according to embodiment 4, wherein the printing apparatus also comprises a further contacting means, wherein the first contacting means electrically contacts the electrically conductive layer in a lamina of the sheetlike composite that is held by the first roll take-up device, wherein the further contacting means electrically contacts the electrically conductive layer in a lamina of the sheetlike composite that is held by the further roll take-up device. Preferably, the further contacting means is designed like the contacting means according to an embodiment of the roll take-up device according to the invention or of the apparatus according to the invention or both. Preferably, the first roll take-up device is designed according to one of embodiments 1 to 25 of the roll take-up device according to the invention. Here, the first contacting means preferably comprises the electrical contact of this roll take-up device. Additionally or alternatively preferably, the further roll take-up device is designed according to one of embodiments 1 to 25 of the roll take-up device according to the invention. Here, the further contacting means preferably comprises the electrical contact of this roll take-up device.

In an embodiment 6 according to the invention, the printing apparatus is configured according to embodiment 5, wherein the printing apparatus also comprises a resistance measuring device, wherein the resistance measuring device is arranged and designed for measuring an electrical resistance of an electrical circuit, comprising a region of the electrically conductive layer that extends from the first contacting means to the further contacting means. A preferred resistance measuring device is a digital resistance measuring device or an analogue resistance measuring device. A preferred digital resistance measuring device is a multimeter. Preferably, the resistance measuring device is connected in an electrically conducting manner to the first contacting means and the further contacting means, preferably in each case by way of a sliding contact.

In an embodiment 7 according to the invention, the printing apparatus is configured according to one of embodiments 4 to 6, wherein the first roll take-up device comprises a first tensioning means or a first rotation shaft or both, wherein the further roll take-up device comprises a further tensioning means or a further rotation shaft or both. A preferred first tensioning means is one selected from the group consisting of a first tensioning cone, a first tensioning shaft and a first tensioning mandrel or a combination of at least two thereof. A preferred further tensioning means is one selected from the group consisting of a further tensioning cone, a further tensioning shaft and a further tensioning mandrel or a combination of at least two thereof. In this context, it is preferred that the first contacting means electrically contacts the electrically conductive layer in a lamina of the sheetlike composite that is overlaid on the first rotation shaft, the first tensioning cone, the first tensioning mandrel or the first tensioning shaft. It is also preferred that the further contacting means electrically contacts the electrically conductive layer in a lamina of the sheetlike composite that is overlaid on the further rotation shaft, the further tensioning cone, the further tensioning mandrel or the further tensioning shaft.

In an embodiment 8 according to the invention, the printing apparatus is configured according to one of embodiments 1 to 7, wherein the first contacting means comprises a first electrical contact, wherein the first roll take-up device comprises
  a) a first carrier element, and
  b) a first lateral surface;
wherein the first carrier element
  a. at least partially surrounds the first lateral surface along a circumference of the first lateral surface, and
  b. is electrically insulated from the first lateral surface;
wherein the first electrical contact is fixed on the first carrier element.

In an embodiment 9 according to the invention, the printing apparatus is configured according to embodiment 8, wherein the first contacting means also comprises a first sliding contact, wherein the first sliding contact contacts the first carrier element in an electrically conducting manner. A preferred first sliding contact comprises, preferably consists of, graphite. A first sliding contact consisting of graphite is also known as a carbon brush, a carbon pin or a collector. A further preferred first sliding contact consists of metal.

In an embodiment 10 according to the invention, the printing apparatus is configured according to one of embodiments 5 to 9, wherein the further contacting means comprises a further electrical contact, wherein the further roll take-up device comprises
  a) a further carrier element, and
  b) a further lateral surface;
wherein the further carrier element
  a. at least partially surrounds the further lateral surface along a circumference of the further lateral surface, and
  b. is electrically insulated from the further lateral surface;
wherein the further electrical contact is fixed on the further carrier element.

In an embodiment 11 according to the invention, the printing apparatus is configured according to embodiment 10, wherein the further contacting means also comprises a further sliding contact, wherein the further sliding contact contacts the further carrier element in an electrically conducting manner. A preferred further sliding contact comprises, preferably consists of, graphite. A further sliding contact consisting of graphite is also known as a carbon brush, a carbon pin or a collector. A further preferred further sliding contact consists of metal.

A contribution to the achievement of at least one of the objects of the invention is made by an embodiment 1 of a process, comprising as process steps
- a) providing a sheetlike composite, comprising as layers of a series of layers in a direction from an outer side of the sheetlike composite to an inner side of the sheetlike composite,
  - i) a carrier layer,
  - ii) a barrier layer and
  - iii) an inner polymer layer;
- b) providing a first roll take-up device, comprising a first electrical contact,
- c) taking up the sheetlike composite by the first roll take-up device, wherein the layer of the series of layers of the sheetlike composite is an electrically conductive layer, wherein, in process step c), the electrically conductive layer is contacted with the first electrical contact in an electrically conducting manner.

In an embodiment 2 according to the invention, the process is configured according to embodiment 1, wherein the electrically conductive layer does not include the outer side or the inner side or both.

In an embodiment 3 according to the invention, the process is configured according to embodiment 1 or 2, wherein the barrier layer is the electrically conductive layer.

In an embodiment 4 according to the invention, the process is configured according to one of embodiments 1 to 3, wherein, for contacting the electrically conductive layer in an electrically conducting manner, the first electrical contact at least partially cuts or perforates or both cuts and perforates at least one lamina of the sheetlike composite.

In an embodiment 5 according to the invention, the process is configured according to one of embodiments 1 to 4, wherein, in process step a), the sheetlike composite is provided as a first roll, wherein, in the first roll, at least 10, preferably at least 20, more preferably at least 30, most preferably at least 50, laminas of the sheetlike composite are overlaid on one another from the inside outwards or vice versa; wherein the laminas respectively have the series of layers, wherein, in process step c), the taking-up takes the form of a mounting of the first roll.

In an embodiment 6 according to the invention, the process is configured according to one of embodiments 1 to 4, wherein, in process step c), the take-up is a rolling up of the sheetlike composite to form a further roll, wherein, in the further roll, at least 10, preferably at least 50, more preferably at least 100, most preferably at least 500, laminas of the sheetlike composite are overlaid on one another from the inside outwards or vice versa; wherein the laminas respectively have the series of layers.

In an embodiment 7 according to the invention, the process is configured according to embodiment 5, wherein the process comprises as further process steps
- d) at least partially unrolling the sheetlike composite from the first roll,
- e) overlaying at least part of the outer side of the sheetlike composite with an ink application.

In an embodiment 8 according to the invention, the process is configured according to embodiment 7, wherein, after process step e), the sheetlike composite is at least partially taken up by a further roll take-up device, comprising a further electrical contact, wherein the electrically conducting layer is contacted with the further electrical contact in an electrically conducting manner. Here, the taking-up of the sheetlike composite by the further roll take-up device preferably comprises a rolling up of the sheetlike composite to form the further roll.

In an embodiment 9 according to the invention, the process is configured according to one of embodiments 1 to 8, wherein, after process step c), the process also comprises producing a container from the sheetlike composite, wherein the producing comprises
- i. folding the sheetlike composite,
- ii. joining regions of the sheetlike composite to obtain a container, and
- iii. closing the container.

Preferably, the process comprises the producing after process step e) and further preferably after the taking-up of the sheetlike composite by the further roll take-up device.

In an embodiment 10 according to the invention, the process is configured according to embodiment 9, wherein the container is filled with a food or drink product before the closing.

A contribution to the achievement of at least one of the objects of the invention is made by an embodiment 1 of a use 1 of the roll take-up device according to the invention according to one of its embodiments 1 to 25 for detecting a defect of the electrically conductive layer. A preferred defect is an interruption of the electrically conductive layer.

A contribution to the achievement of at least one of the objects of the invention is made by an embodiment 1 of a use 2 of the roll take-up device according to the invention according to one of its embodiments 1 to 25 when printing onto the sheetlike composite.

A contribution to the achievement of at least one of the objects of the invention is made by an embodiment 1 of a use 3 of a tensioning means for taking up a sheetlike composite, wherein the sheetlike composite comprises, as layers of a series of layers in a direction from an outer side of the sheetlike composite to an inner side of the sheetlike composite,
- i) a carrier layer,
- ii) a barrier layer, and
- iii) an inner polymer layer, wherein a layer of the series of layers of the sheetlike composite is an electrically conductive layer, characterized in that, in the take-up, the electrically conductive layer is contacted in an electrically conducting manner with an electrical contact comprised by the tensioning means. The tensioning means is preferably used in the roll take-up according to the invention according to one of its embodiments 1 to 25. Preferably, the tensioning means is comprised by the roll take-up according to the invention according to one of its embodiments 1 to 25.

In an embodiment 2 according to the invention, the use 3 is configured according to embodiment 1, wherein the electrically conductive layer does not include the outer side or the inner side or both.

In an embodiment 3 according to the invention, the use 3 is configured according to embodiment 1 or 2, wherein the barrier layer is the electrically conductive layer.

In an embodiment 4 according to the invention, the use 3 is configured according to one of embodiments 1 to 3, wherein, for the electrically conducting contacting of the barrier layer, the electrical contact at least partially cuts or perforates or both cuts and perforates at least one lamina of the sheetlike composite.

In an embodiment 5 according to the invention, the use 3 is configured according to one of embodiments 1 to 4, wherein the take-up is a rolling up of the sheetlike composite to form a roll, wherein, in the roll, at least 10, preferably at least 50, more preferably at least 100, most preferably at least 500, laminas of the sheetlike composite are overlaid on one another from the inside outwards or vice versa, wherein the laminas respectively have the series of layers.

In an embodiment 6 according to the invention, the use 3 is configured according to one of embodiments 1 to 4, wherein the taking-up takes the form of a mounting of a roll of the sheetlike composite, wherein, in the roll, at least 10, preferably at least 50, more preferably at least 100, most preferably at least 500, laminas of the sheetlike composite are overlaid on one another from the inside outwards or vice versa, wherein the laminas respectively have the series of layers.

Features described as preferred in one category of the invention are likewise preferred in an embodiment of the further categories of the invention.

Layers of the Sheetlike Composite

The layers of the series of layers are joined to one another. Two layers are joined to one another when their adhesion to one another extends beyond van der Waals attraction forces. Layers that have been joined to one another preferably belong to a category selected from the group consisting of sealed to one another, bonded to one another and compressed to one another, or a combination of at least two thereof. Unless stated otherwise, in a series of layers, the layers may follow one another indirectly, i.e. with one or at least two intermediate layers, or directly, i.e. with no intermediate layer. This is the case especially in the setup where one layer is overlaid on another layer. A setup where a series of layers comprises enumerated layers means that at least the layers specified are present in the sequence specified. This setup does not necessarily mean that these layers follow on directly from one another. A setup where two layers adjoin one another means that these two layers follow on from one another directly and hence with no intermediate layer. However, this setup does not specify whether or not the two layers are joined to one another. Instead, these two layers may be in contact with one another.

Polymer Layers

The term "polymer layer" refers hereinafter especially to the inner polymer layer, the intermediale polymer layer and the outer polymer layer. A preferred polymer is a polyolefin. The polymer layers may have further constituents. The polymer layers are preferably introduced into or applied to the sheetlike composite material in an extrusion process. The further constituents of the polymer layers are preferably constituents that do not adversely affect the behaviour of the polymer melt on application as a layer. The further constituents may, for example, be inorganic compounds, such as metal salts, or further polymers, such as further thermoplastics. However, it is also conceivable that the further constituents are fillers or pigments, for example carbon black or metal oxides. Suitable thermoplastics for the further constituents especially include those that are readily processible by virtue of good extrusion characteristics. Among these, polymers obtained by chain polymerization are suitable, especially polyesters or polyolefins, particular preference being given to cyclic olefin copolymers (COCs), polycyclic olefin copolymers (POCs), especially polyethylene and polypropylene, and very particular preference to polyethylene. Among the polyethylenes, preference is given to HDPE (high density polyethylene), MDPE (medium density polyethylene), LDPE (low density polyethylene), LLDPE (linear low density polyethylene) and VLDPE (very low density polyethylene) and mixtures of at least two thereof. It is also possible to use mixtures of at least two thermoplastics. Suitable polymer layers have a melt flow rate (MFR) within a range from 1 to 25 g/10 min, preferably within a range from 2 to 20 g/10 min and more preferably within a range from 2.5 to 15 g/10 min, and a density within a range from 0.890 g/cm$^3$ to 0.980 g/cm$^3$, preferably within a range from 0.895 g/cm$^3$ to 0.975 g/cm$^3$, and further preferably within a range from 0.900 g/cm$^3$ to 0.970 g/cm$^3$. The polymer layers preferably have at least one melting temperature within a range from 80 to 155° C., preferably within a range from 90 to 145° C. and more preferably within a range from 95 to 135° C.

Inner Polymer Layer

The inner polymer layer is based on thermoplastic polymers, where the inner polymer layer may include a particulate inorganic solid. However, it is preferable that the inner polymer layer comprises a thermoplastic polymer to an extent of at least 70% by weight, preferably at least 80% by weight and more preferably at least 95% by weight, based in each case on the total weight of the inner polymer layer. Preferably, the polymer or polymer mixture of the inner polymer layer has a density (to ISO 1183-1:2004) within a range from 0.900 to 0.980 g/cm$^3$, more preferably within a range from 0.900 to 0.960 g/cm$^3$ and most preferably within a range from 0.900 to 0.940 g/cm$^3$. The polymer is preferably a polyolefin, mPolymer or a combination of the two.

Carrier Layer

The carrier layer used may be any material which is suitable for a person skilled in the art for this purpose and which has sufficient strength and stiffness to impart stability to the container to such an extent that the container in the filled state essentially retains its shape. This is, in particular, a necessary feature of the carrier layer since the invention relates to the technical field of dimensionally stable containers. Dimensionally stable containers of this kind should in principle be distinguished from pouches and bags, which are usually produced from thin films. As well as a number of plastics, preference is given to plant-based fibrous materials, especially pulps, preferably limed, bleached and/or unbleached pulps, paper and cardboard being especially preferred. Accordingly, a preferred carrier layer comprises a multiplicity of fibres. The basis weight of the carrier layer is preferably within a range from 120 to 450 g/m$^2$, especially preferably within a range from 130 to 400 g/m$^2$ and most preferably within a range from 150 to 380 g/m$^2$. A preferred cardboard generally has a single-layer or multilayer structure and may have been coated on one or both sides with one or else more than one outer layer. In addition, a preferred cardboard has a residual moisture content of less than 20% by weight, preferably of 2% to 15% by weight and especially preferably of 4% to 10% by weight, based on the total weight of the cardboard. An especially preferred cardboard has a multilayer structure. Further preferably, the cardboard has, on the surface facing the environment, at least one lamina, but more preferably at least two laminas, of an outer layer known to the person skilled in the art as a "coating slip". In addition, a preferred cardboard has a Scott bond value (according to Tappi T403um) within a range from 100 to 360 J/m$^2$, preferably from 120 to 350 J/m$^2$ and especially preferably from 135 to 310 J/m$^2$. By virtue of the aforementioned ranges, it is possible to provide a composite from which it is possible to fold a container with high integrity, easily and in low tolerances.

The carrier layer is characterized by a bending resistance, which can be measured with a bending measuring device. A Code 160 from Lorentzen & Wettre, Sweden, is used as the bending measuring device. The carrier layer preferably has a bending resistance in a first direction in the range from 80 to 550 mN. In the case of a carrier layer that comprises a multiplicity of fibres, the first direction is preferably a direction of orientation of the fibres. A carrier layer that comprises a multiplicity of fibres also preferably has a bending resistance in a second direction, perpendicular to the first direction, in a range from 20 to 300 mN. The samples used for measuring the bending resistance with the above measuring device have a width of 38 mm and a clamping length of 50 mm. A preferred sheetlike composite with the carrier layer has a bending resistance in the first direction in a range from 100 to 700 mN. Further preferably, the aforementioned sheetlike composite has a bending resistance in the second direction in a range from 50 to 500 mN. The samples of the sheetlike composite used for measuring with the above measuring device also have a width of 38 mm and a clamping length of 50 mm.

Barrier Layer

The barrier layer used may be any material which is suitable for a person skilled in the art for this purpose and which has sufficient barrier action, especially with respect to oxygen. The barrier layer is preferably selected from a. a polymer barrier layer;
    b. a metal layer;
    c. a metal oxide layer; or
    d. a combination of at least two of a. to c.

If the barrier layer, according to alternative a., is a polymer barrier layer, this preferably comprises at least 70% by weight, especially preferably at least 80% by weight and most preferably at least 95% by weight of at least one polymer which is known to the person skilled in the art for this purpose, especially for aroma or gas barrier properties suitable for packaging containers. Useful polymers, especially thermoplastics, here include N- or O-bearing polymers, either alone or in mixtures of two or more. According to the invention, it may be found to be advantageous when the polymer barrier layer has a melting temperature within a range from more than 155 to 300° C., preferably within a range from 160 to 280° C. and especially preferably within a range from 170 to 270° C.

Further preferably, the polymer barrier layer has a basis weight within a range from 2 to 120 g/m², preferably within a range from 3 to 60 g/m², especially preferably within a range from 4 to 40 g/m² and further preferably from 6 to 30 g/m². Further preferably, the polymer barrier layer is obtainable from melts, for example by extrusion, especially laminar extrusion. Further preferably, the polymer barrier layer may also be introduced into the sheetlike composite via lamination. It is preferable in this context that a film is incorporated into the sheetlike composite. In another embodiment, it is also possible to select polymer barrier layers obtainable by deposition from a solution or dispersion of polymers.

Suitable polymers preferably include those having a weight-average molecular weight, determined by gel permeation chromatography (GPC) by means of light scattering, within a range from $3\times10^3$ to $1\cdot10^7$ g/mol, preferably within a range from $5\cdot10^3$ to $1\cdot10^6$ g/mol and especially preferably within a range from $6.10^3$ to $1.10^5$ g/mol. Suitable polymers especially include polyamide (PA) or polyethylene vinyl alcohol (EVOH) or a mixture thereof.

Among the polyamides, useful PAs are all of those that seem suitable to the person skilled in the art for the use according to the invention. Particular mention should be made here of PA 6, PA 6.6, PA 6.10, PA 6.12, PA 11 or PA 12 or a mixture of at least two thereof, particular preference being given to PA 6 and PA 6.6 and further preference to PA 6. PA 6 is commercially available, for example, under the Akulon®, Durethan® and Ultramid® trade names. Additionally suitable are amorphous polyamides, for example MXD6, Grivory® and Selar® PA. It is further preferable that the PA has a density within a range from 1.01 to 1.40 g/cm³, preferably within a range from 1.05 to 1.30 g/cm³ and especially preferably within a range from 1.08 to 1.25 g/cm³. It is also preferable that the PA has a viscosity number within a range from 130 to 250 ml/g and preferably within a range from 140 to 220 ml/g.

Useful EVOHs include all the EVOHs that seem suitable to the person skilled in the art for the use according to the invention. Examples of these are commercially available, inter alia, under the EVAL trade names from EVAL Europe NV, Belgium, in a multitude of different versions, for example the EVAL™ F104B or EVAL LR171B types. Preferred EVOHs have at least one, two, more than two or all of the following properties:

an ethylene content within a range from 20 to 60 mol %, preferably from 25 to 45 mol %;
    a density within a range from 1.0 to 1.4 g/cm³, preferably from 1.1 to 1.3 g/cm³;
    a melting point within a range from more than 155 to 235° C., preferably from 165 to 225° C.;
    an MFR value (210° C./2.16 kg when $T_{S(EVOH)}$<230° C.; 230° C./2.16 kg when 210° C.<$T_{S(EVOH)}$<230° C.) within a range from 1 to 25 g/10 min, preferably from 2 to 20 g/10 min;
    an oxygen permeation rate within a range from 0.05 to 3.2 cm³·20 μm/m²·day·atm, preferably within a range from 0.1 to 1 cm³·20 μm/m²·day·atm.

Preferably at least one polymer layer, further preferably the inner polymer layer, or preferably all polymer layers, has/have a melting temperature below the melting temperature of the barrier layer. This is especially true when the barrier layer is formed from polymer. The melting temperatures of the at least one polymer layer, especially the inner polymer layer, and the melting temperature of the barrier layer preferably differ here by at least 1 K, especially preferably by at least 10 K, still more preferably by at least 50 K, even more preferably by at least 100 K. The temperature difference should preferably be chosen to be only of such an amount that there is no melting of the barrier layer, especially no melting of the polymer barrier layer, during the folding.

According to alternative b., the barrier layer is a metal layer. Suitable metal layers are in principle all layers comprising metals which are known to the person skilled in the art and which can provide high light opacity and oxygen impermeability. In a preferred embodiment, the metal layer may take the form of a foil or a deposited layer, for example after a physical gas phase deposition. The metal layer is preferably an uninterrupted layer. In a further preferred embodiment, the metal layer has a thickness within a range from 3 to 20 μm, preferably within a range from 3.5 to 12 μm and especially preferably within a range from 4 to 10 μm.

Metals selected with preference are aluminium, iron or copper. A preferred iron layer may be a steel layer, for example in the form of a foil. Further preferably, the metal layer is a layer comprising aluminium. The aluminium layer may appropriately consist of an aluminium alloy, for example AlFeMn, AlFe1.5Mn, AlFeSi or AlFeSiMn. The purity is typically 97.5% or higher, preferably 98.5% or higher, based in each case on the overall aluminium layer. In a particular configuration, the metal layer consists of an aluminium foil. Suitable aluminium foils have a ductility of more than 1%, preferably of more than 1.3% and especially preferably of more than 1.5%, and a tensile strength of more than 30 N/mm², preferably more than 40 N/mm² and especially preferably more than 50 N/mm². Suitable aluminium foils exhibit in the pipette test a droplet size of more than 3 mm, preferably more than 4 mm and especially preferably of more than 5 mm. Suitable alloys for producing aluminium layers or foils are commercially available under the designations EN AW 1200, EN AW 8079 or EN AW 8111 from Hydro Aluminium Deutschland GmbH or Amcor Flexibles Singen GmbH. In the case of a metal foil as a barrier layer, it is possible to provide an adhesion promoter layer between the metal foil and a closest polymer layer on one and/or both sides of the metal foil.

Further preferably, the barrier layer selected, according to alternative c., may be a metal oxide layer. Useful metal oxide layers include all metal oxide layers that are familiar and seem suitable to the person skilled in the art, in order to achieve a barrier effect with respect to light, vapour and/or gas. Especially preferred are metal oxide layers based on the metals already mentioned above, aluminium, iron or copper, and those metal oxide layers based on titanium oxide or silicon oxide compounds. A metal oxide layer is produced by way of example by vapour deposition of metal oxide on a polymer layer, for example an oriented polypropylene film. A preferred process for this purpose is physical gas phase deposition.

In a further preferred embodiment, the metal layer of the metal oxide layer may take the form of a layer composite composed of one or more polymer layers with a metal layer. Such a layer is obtainable, for example, by vapour deposition of metal on a polymer layer, for example an oriented polypropylene film. A preferred process for this purpose is physical gas phase deposition.

Adhesion/Adhesion Promoter Layer

An adhesion promoter layer may be present between layers which do not directly adjoin one another, preferably between the barrier layer and the inner polymer layer. Useful adhesion promoters in an adhesion promoter layer include all polymers which are suitable for producing a firm bond through functionalization by means of suitable functional groups, through the forming of ionic bonds or covalent bonds with a surface of a respective adjacent layer.

Preferably, these comprise functionalized polyolefins which have been obtained by copolymerization of ethylene with acrylic acids such as acrylic acid, methacrylic acid, crotonic acid, acrylates, acrylate derivatives or carboxylic anhydrides that bear double bonds, for example maleic anhydride, or at least two thereof. Among these, preference is given to polyethylene-maleic anhydride graft polymers (EMAH), ethylene-acrylic acid copolymers (EAA) or ethylene-methacrylic acid copolymers (EMAA), which are sold, for example, under the Bynel® and Nucrel®0609HSA trade names by DuPont or the Escor® 6000ExCo trade name by ExxonMobil Chemicals.

According to the invention, it is preferable that the adhesion between a carrier layer, a polymer layer or a barrier layer and the next layer in each case is at least 0.5 N/15 mm, preferably at least 0.7 N/15 mm and especially preferably at least 0.8 N/15 mm. In one configuration according to the invention, it is preferable that the adhesion between a polymer layer and a carrier layer is at least 0.3 N/15 mm, preferably at least 0.5 N/15 mm and especially preferably at least 0.7 N/15 mm. It is further preferable that the adhesion between a barrier layer and a polymer layer is at least 0.8 N/15 mm, preferably at least 1.0 N/15 mm and especially preferably at least 1.4 N/15 mm. If a barrier layer indirectly follows a polymer layer with an adhesion promoter layer in between, it is preferable that the adhesion between the barrier layer and the adhesion promoter layer is at least 1.8 N/15 mm, preferably at least 2.2 N/15 mm and especially preferably at least 2.8 N/15 mm. In a particular configuration, the adhesion between the individual layers is sufficiently strong that a carrier layer is torn apart in an adhesion test, called a cardboard fibre tear in the case of a cardboard as the carrier layer.

Polyolefin

A Preferred Polyolefin is a Polyethylene (PE) or a Polypropylene (PP) or Both. A Preferred polyethylene is one selected from the group consisting of an LDPE, an LLDPE, and an HDPE, or a combination of at least two thereof. A further preferred polyolefin is an mPolyolefin (polyolefin prepared by means of a metallocene catalyst). Suitable polyethylenes have a melt flow rate (MFR=MFI–melt flow index) within a range from 1 to 25 g/10 min, preferably within a range from 2 to 20 g/10 min and especially preferably within a range from 2.5 to 15 g/10 min, and a density within a range from 0.910 g/cm³ to 0.935 g/cm³, preferably within a range from 0.912 g/cm³ to 0.932 g/cm³, and further preferably within a range from 0.915 g/cm³ to 0.930 g/cm³.

mPolymer

An mPolymer is a polymer which has been prepared by means of a metallocene catalyst. A metallocene is an organometallic compound in which a central metal atom is arranged between two organic ligands, for example cyclopentadienyl ligands. A preferred mPolymer is an mPolyolefin, preferably an mPolyethylene or an mPolypropylene or both. A preferred mPolyethylene is one selected from the group consisting of an mLDPE, an mLLDPE, and an mHDPE, or a combination of at least two thereof.

Extrusion

In the extrusion, the polymers are typically heated to temperatures of 210 to 350° C., measured in the molten polymer film beneath the exit from the extruder die. The extrusion can be effected by means of extrusion tools which are known to those skilled in the art and are commercially available, for example extruders, extruder screws, feed blocks, etc. At the end of the extruder, there is preferably an opening through which the polymer melt is expressed. The opening may have any shape that allows extrusion of the polymer melt. For example, the opening may be angular, oval or round. The opening is preferably in the form of a slot of a funnel. Once the melt layer has been applied to the substrate layer by means of the above-described process, the melt layer is left to cool down for the purpose of heat-setting, this cooling preferably being effected by quenching via contact with a surface which is kept at a temperature within a range from 5 to 50° C., especially preferably within a range from 10 to 30° C. Subsequently, at least the flanks are separated from the area. The separation may be carried out in any way that is familiar and appears suitable to a person skilled in the art for separating the flanks quickly, as precisely as possible and cleanly. Preferably, the separation is effected by means of a knife, laser beam or waterjet, or a combination of two or more thereof, the use of knives being especially preferable, especially a top knife.

Food or Drink Product

The sheetlike composite of the invention is preferably designed for production of a food or drink product container. In addition, the closed container according to the invention is preferably a food or drink product container. Food and drink products include all kinds of food and drink known to those skilled in the art for human consumption and also animal feeds. Preferred food and drink products are liquid above 5° C., for example milk products, soups, sauces, non-carbonated drinks.
Colourant According to DIN 55943:2001-10, colourant is the collective term for all colouring substances, especially for dyes and pigments. A preferred colourant is a pigment. A preferred pigment is an organic pigment. Pigments that are notable in connection with the invention are especially the pigments mentioned in DIN 55943:2001-10 and those mentioned in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9). A pigment is a colourant that is preferably insoluble in the application medium. A dye is a colourant that is preferably soluble in the application medium.
Container The closed container produced from the sheetlike composite may have a multitude of different forms, but preference is given to an essentially cuboidal structure. In addition, the full area of the container may be formed from the sheetlike composite, or it may have a two-part or multipart construction. In the case of a multipart construction, it is conceivable that, as well as the sheetlike composite, other materials are also used, for example plastic, which can be used especially in the top or base regions of the container. In this context, however, it is preferable that the container is formed from the sheetlike composite to an extent of at least 50%, especially preferably to an extent of at least 70% and further preferably to an extent of at least 90% of the area. In addition, the container may have a device for emptying the contents. This may be formed, for example, from a polymer or mixture of polymers and be attached on the outside of the container. It is also conceivable that this device has been integrated into the container by "direct injection moulding". In a preferred configuration, the container according to the invention has at least one edge, preferably from 4 to 22 or else more edges, especially preferably from 7 to 12 edges. Edges in the context of the present invention are understood to mean regions which arise in the folding of a surface. Examples of edges include the longitudinal contact regions between two wall surfaces of the container in each case, also referred to as longitudinal edges herein. In the container, the container walls are preferably the surfaces of the container framed by the edges. Preferably, the interior of a container according to the invention comprises a food or drink product. Preferably, the closed container does not comprise any lid or base, or either, that has not been formed in one piece with the sheetlike composite.
Hole The at least one hole that is provided in the carrier layer according to preferred embodiments may have any shape that is known to a person skilled in the art and suitable for various closures or drinking straws. The holes often have rounded portions in plan view. Thus, the holes may be essentially circular, oval, elliptical or drop-shaped. The shape of the at least one hole in the carrier layer usually also predetermines the shape of the opening that is produced either by an openable closure which is connected to the container and through which the content of the container is dispensed from the container after opening, or by a drinking straw in the container. Consequently, the openings of the opened container often have shapes that are comparable to or even the same as the at least one hole in the carrier layer. Configurations of the sheetlike composite with a single hole primarily serve for letting out the food or drink located in the container that is produced from the sheetlike composite. A further hole may be provided, especially for letting air into the container while the food or drink is being let out.

In the context of covering the at least one hole of the carrier layer, it is preferred that the hole-covering layers are joined to one another at least partially, preferably to the extent of at least 30%, preferably at least 70% and especially preferably at least 90%, of the surface area formed by the at least one hole. It is also preferred that the hole-covering layers are joined to one another at the edges of the at least one hole and preferably lie against the edges when they are joined, in order in this way to achieve improved integrity by a joining connection that extends over the entire surface area of the hole. The hole-covering layers are often joined to one another by way of the region that is formed by the at least one hole in the carrier layer. This leads to a good integrity of the container formed from the composite, and consequently to a desired long shelf life of the food or drink products kept in the container.
Opening/Opening Aid The opening of the container is usually brought about by at least partially destroying the hole-covering layers that cover the at least one hole. This destruction can be effected by cutting, pressing into the container or pulling out of the container. The destruction can be effected by means of an opening aid which is connected to the container and is arranged in the region of the at least one hole, usually above the at least one hole, for example also by a drinking straw which is pushed through the hole-covering layers. It is also preferred in a configuration according to the invention that an opening aid is provided in the region of the at least one hole. It is preferred here that the opening aid is provided on the surface area of the composite that represents the outer side of the container. The container also preferably comprises a closure, for example a lid, on the outer side of the container. It is in this case preferred that the closure covers the hole at least partially, preferably completely. Consequently, the closure protects the hole-covering layers, which are less robust in comparison with the regions outside the at least one hole, from damaging mechanical effects. For opening the hole-covering layers that cover the at least one hole, the closure often comprises the opening aid. Suitable as such an opening aid are for example hooks for tearing out at least part of the hole-covering layers, edges or cutting edges for cutting into the hole-covering layers or spikes for puncturing the hole-covering layers, or a combination of at least two thereof. These opening aids are often mechanically coupled to a screw lid or a cap of the closure, for example by way of a hinge, so that the opening aids act on the hole-covering layers to open the close container when the screw lid or the cap is actuated. Closure systems of this kind, comprising composite layers covering a hole, openable closures that cover this hole and have opening aids, are sometimes referred to in the specialist literature as "overcoated holes" with "applied fitments".
Ink Application An ink application comprises at least one colourant, preferably in a proportion within a range from 5 to 15% by weight, more preferably from 8 to 15% by weight, more preferably from 13 to 15% by weight, based in each case on the weight of the ink application. A preferred ink application consists of a multitude of preferably printed dots. The ink application preferably forms a decoration. A further preferred ink application also comprises an application medium. A preferred application medium is an organic medium. A preferred organic medium is an organic binder. A preferred organic binder is a thermoplastic. A preferred thermoplastic is polyvinyl butyral (PVB). The ink application preferably adjoins the outer polymer layer, wherein the outer polymer layer preferably adjoins the carrier layer. The ink application can preferably be obtained by printing. Preferred printing here is offset printing or gravure printing or both. A further preferred ink application is not overlaid by any further layer of the series of layers on a side of the ink application that is facing away from the carrier layer.

Folding of the Sheetlike Composite

The folding of the sheetlike composite is preferably performed in a temperature range from 10 to 50° C., preferably in a range from 15 to 45° C. and especially preferably in a range from 20 to 40° C. This can be achieved by the sheetlike composite being at a temperature in the aforementioned ranges. It is also preferred that a folding tool, preferably together with the sheetlike composite, is at a temperature in the aforementioned ranges. For this purpose, the folding tool preferably does not have a heating means. Rather, the folding tool or else the sheetlike composite or both may be cooled. It is also preferred that the folding is performed at a temperature of at most 50° C., as "cold folding", and the joining takes place at over 50° C., preferably over 80° C. and especially preferably over 120° C., as "hot sealing". The aforementioned conditions, and especially temperatures, preferably also apply in the environment of the folding, for example in the housing of the folding tool.

"Folding" is understood here as meaning, according to the invention, an operation in which an elongated crease, forming an angle, is made in the folded sheetlike composite, preferably by means of a folding edge of a folding tool. For this purpose, often two surface areas adjoining one another of a sheetlike composite are bent increasingly towards one another. The folding produces at least two folding surface areas adjoining one another, which can then be joined at least in partial regions to form a region of a container. According to the invention, the joining may be performed by any measure that appears suitable to a person skilled in the art and allows a joining connection that is as impermeable to gas and liquid as possible. The joining may be performed by sealing or adhesive bonding or a combination of the two measures. In the case of sealing, the joining connection is created by means of a liquid and solidifying thereof. In the case of adhesive bonding, chemical bonds form between the interfaces or surfaces of the two articles to be joined and create the joining connection. It is often advantageous in the case of sealing or adhesive bonding to press together the surface areas that are to be sealed or bonded.

MEASURING METHODS

The following measuring methods were used within the context of the invention. Unless stated otherwise, the measurements were conducted at an ambient temperature of 23° C., an ambient air pressure of 100 kPa (0.986 atm) and a relative air humidity of 50%.

MFR

MFR is measured according to standard ISO 1133 (unless stated otherwise at 190° C. and 2.16 kg).

Density

Density is measured according to standard ISO 1183-1.

Melting Temperature

Melting temperature is determined on the basis of the DSC method ISO 11357-1, -5. The instrument is calibrated according to the manufacturer's instructions on the basis of the following measurements:

temperature of indium onset temperature,
heat of fusion of indium,
temperature of zinc onset temperature.

Oxygen Permeation Rate

Oxygen permeation rate is determined according to standard ISO 14663-2 Appendix C at 20° C. and 65% relative air humidity.

Viscosity Number of PA

The viscosity number of PA is measured according to the standard DIN EN ISO 307 (2013-08) in 95% sulphuric acid.

Molecular Weight Distribution

The molecular weight distribution is measured by gel permeation chromatography by means of light scattering: ISO 16014-3/-5 (2009-09).

Moisture Content of Cardboard

The moisture content of the cardboard is measured according to the standard ISO 287:2009.

Adhesion

The adhesion of two adjacent layers is determined by fixing them in a 90° peel test instrument, for example the Instron "German rotating wheel fixture", on a rotatable roller which rotates at 40 mm/min during the measurement. The samples had been cut beforehand into strips 15 mm wide. On one side of the sample, the laminas are detached from one another and the detached end is clamped in a tensile device directed vertically upward. A measuring instrument to determine the tensile force is attached to the tensile device. As the roller rotates, the force needed to separate the laminas from one another is measured. This force corresponds to the adhesion of the layers to one another and is reported in N/15 mm. The separation of the individual layers can be effected mechanically, for example, or by means of a controlled pretreatment, for example by soaking the sample in 30% acetic acid at 60° C. for 3 min.

Detection of Colourants

Detection of organic colourants can be conducted in accordance with the methods described in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Steel Composition

The chemical analysis of the alloying constituents of the steel was conducted according to the standards given below. A sample of the steel was respectively used for each measurement.

C—DIN EN 10036:1990-04
Ni—DIN EN 10136:1990-04
Cr—DIN EN 10188:1990-04
Mo—ISO 4941:1994-12

Figure 2:
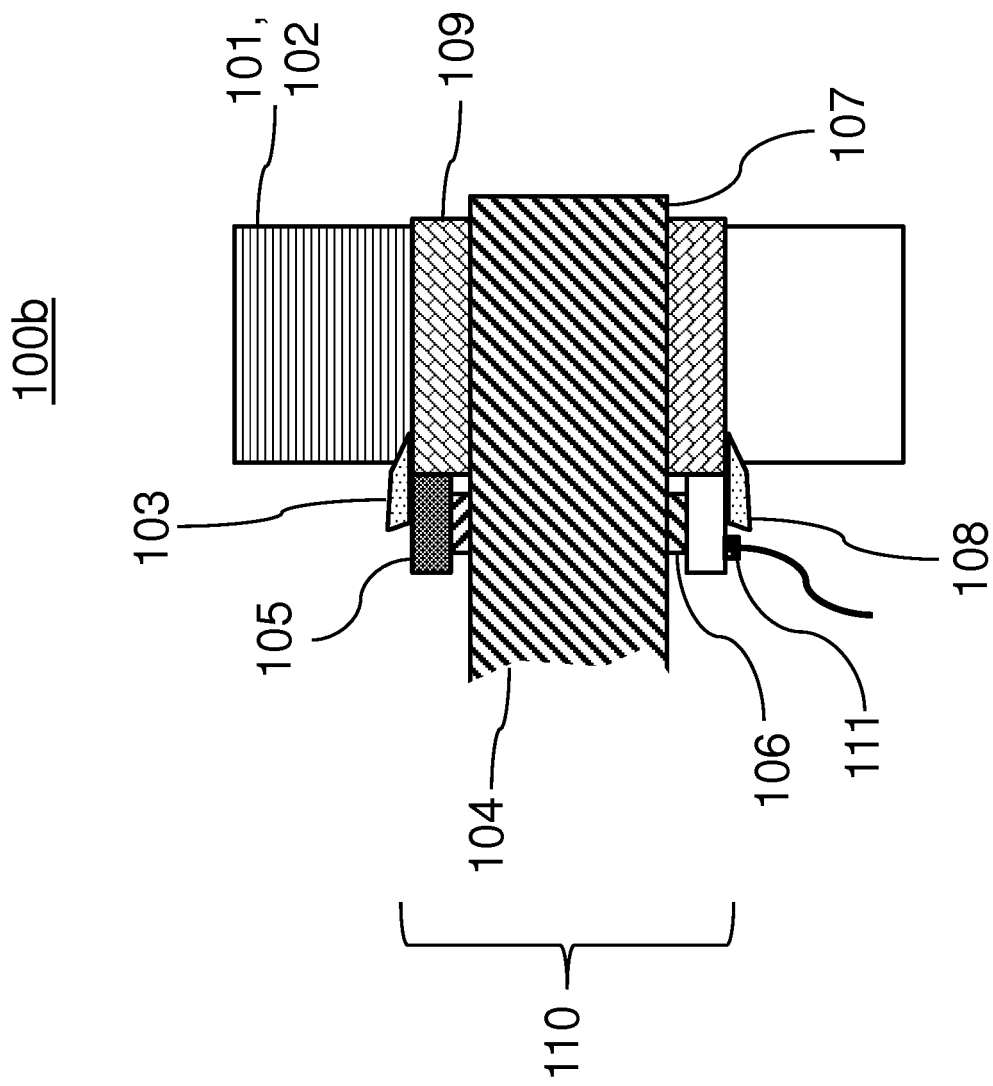
Figure 3:
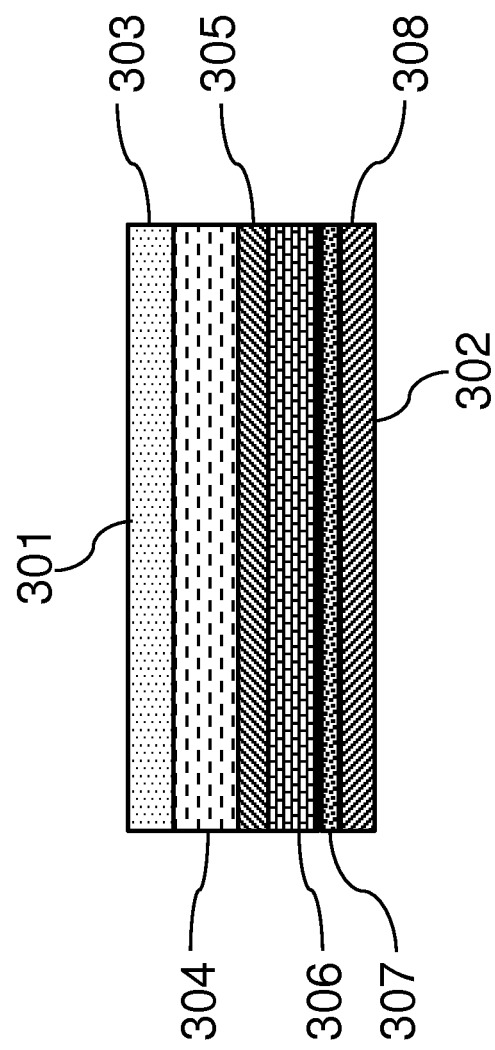
Figure 4:
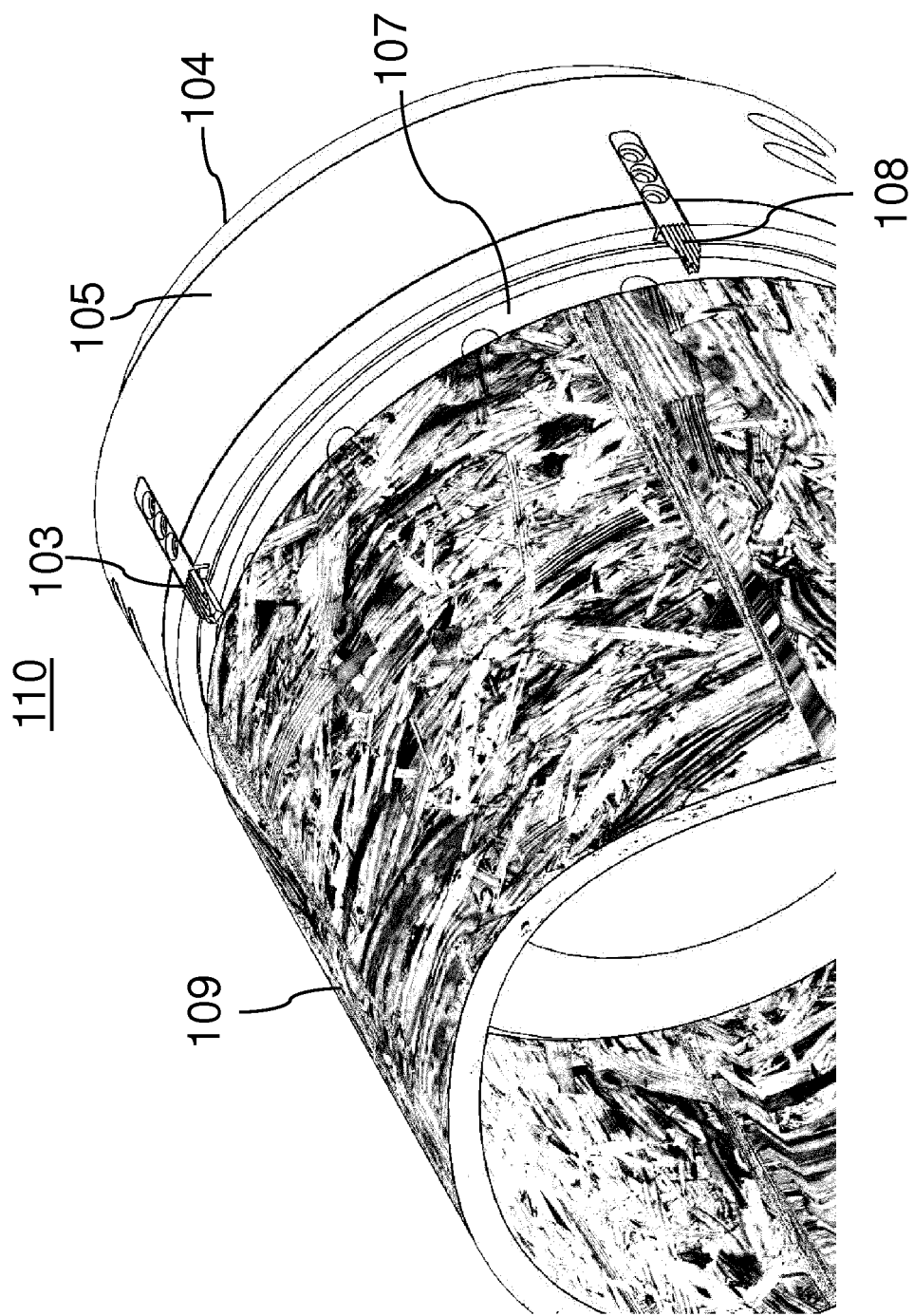
Figure 5:
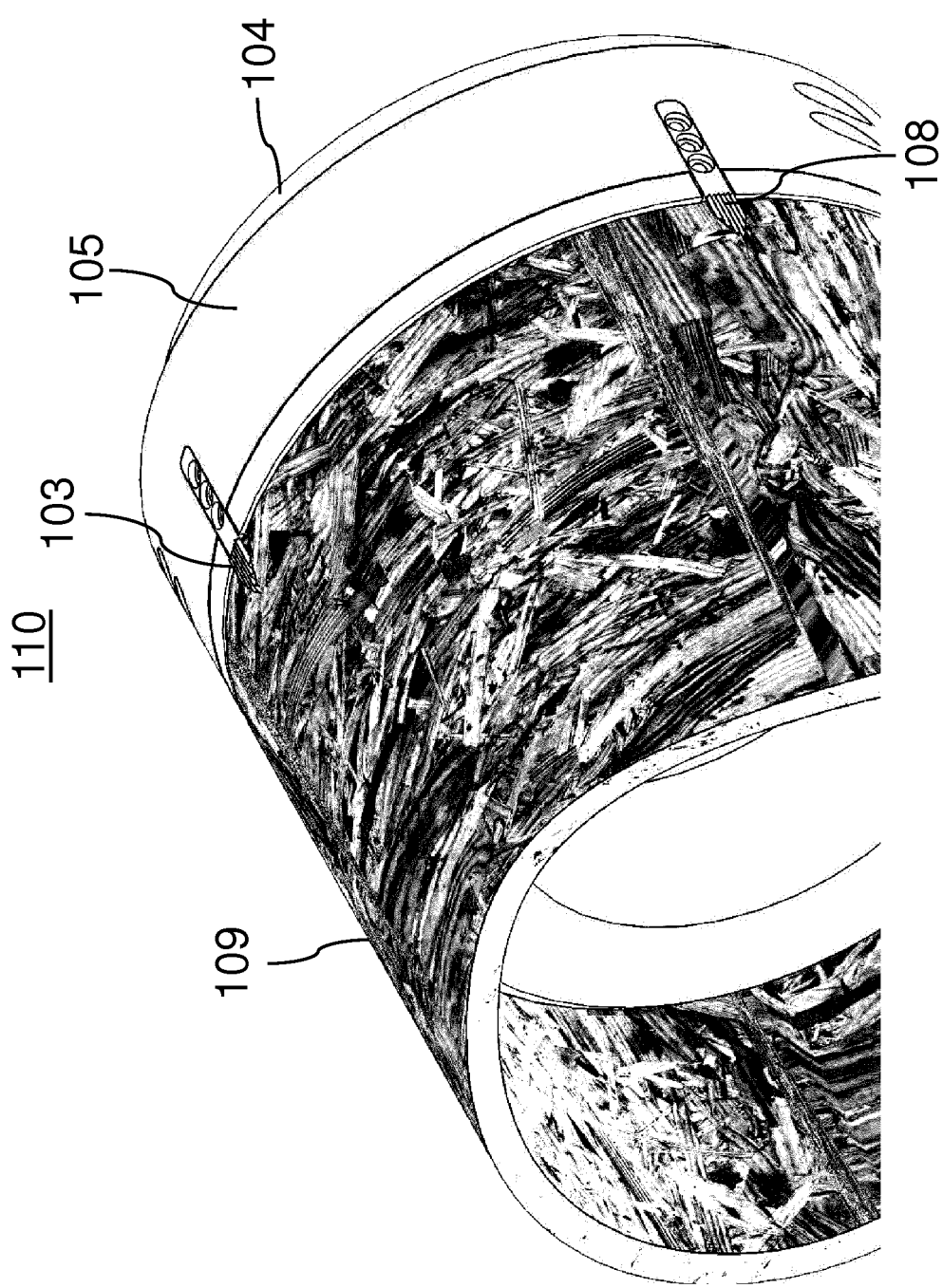
Figure 6:
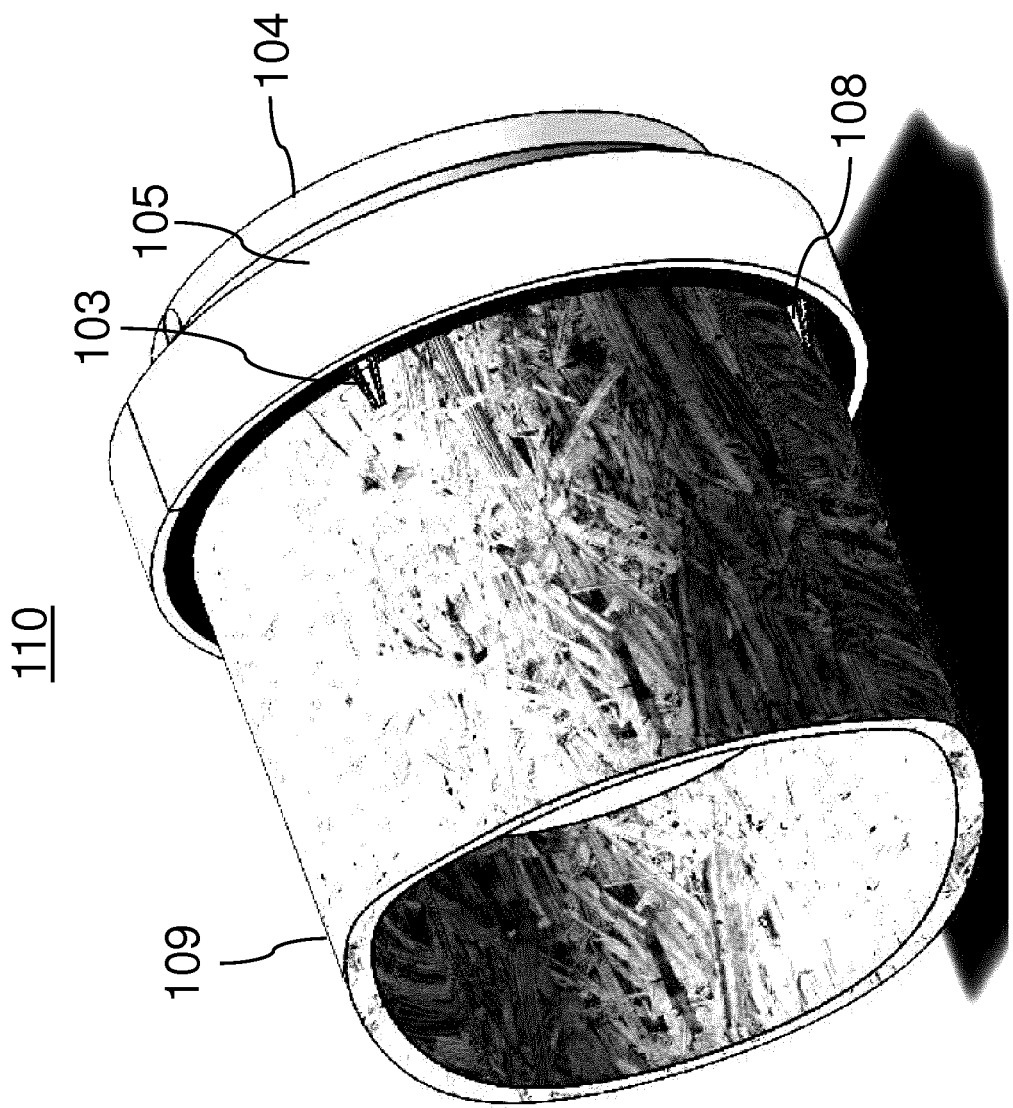
Figure 7:
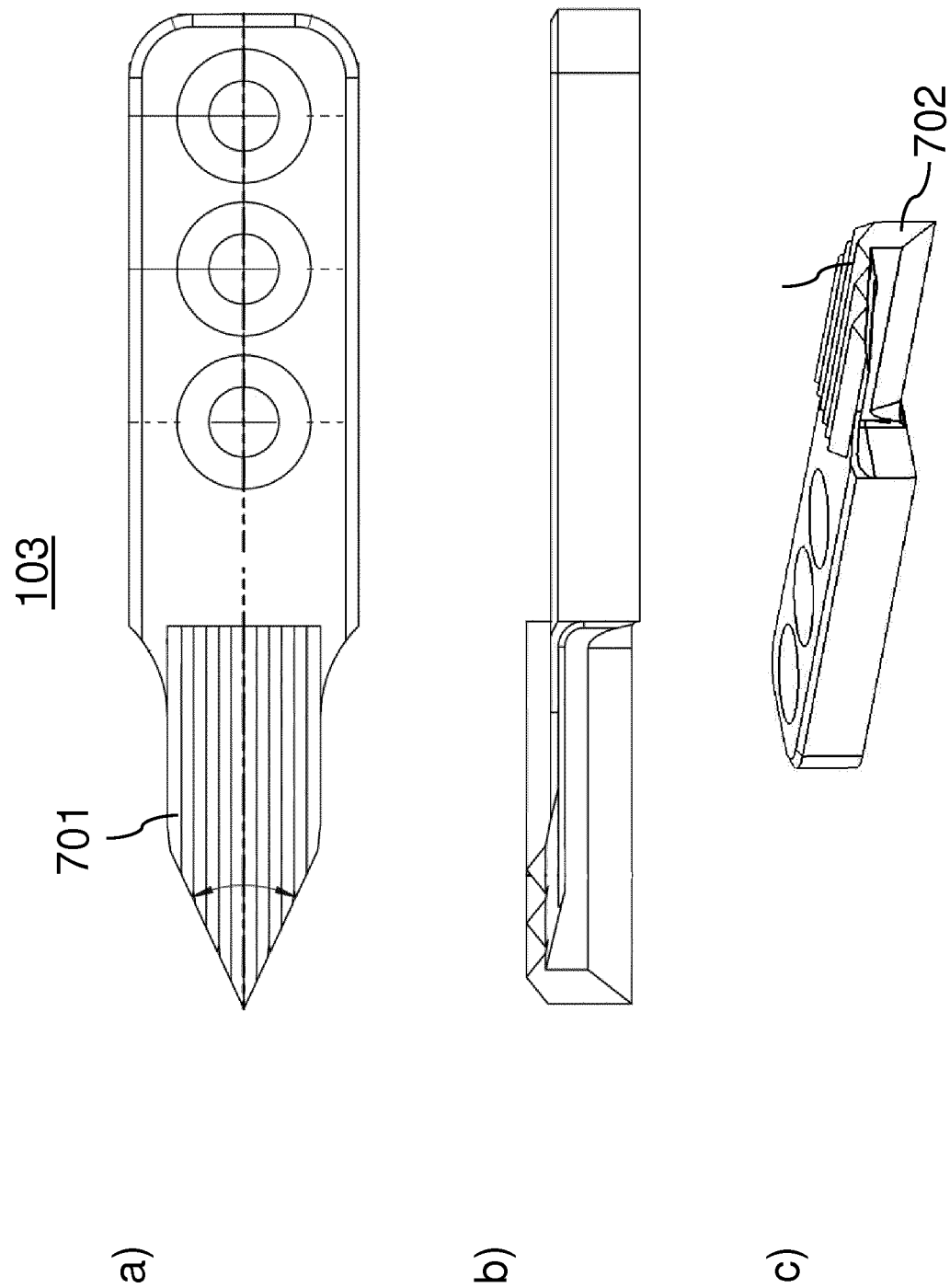
Figure 8:
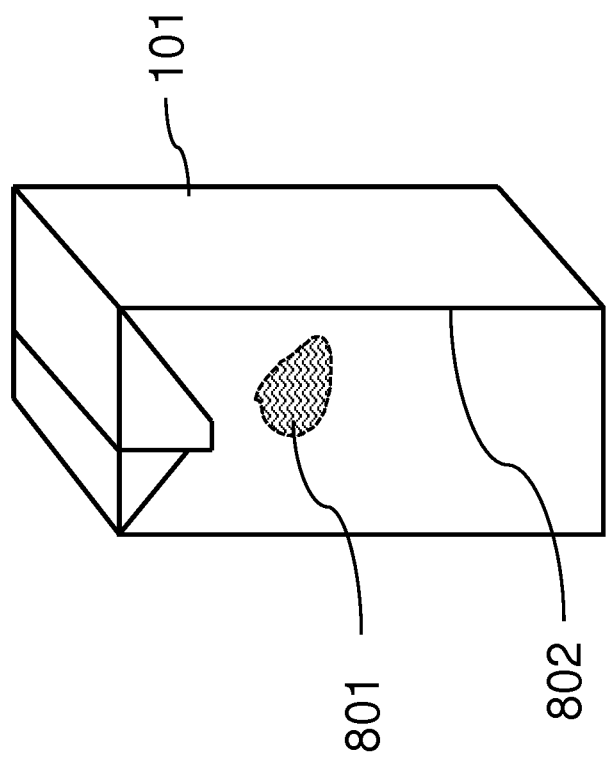
Figure 9:
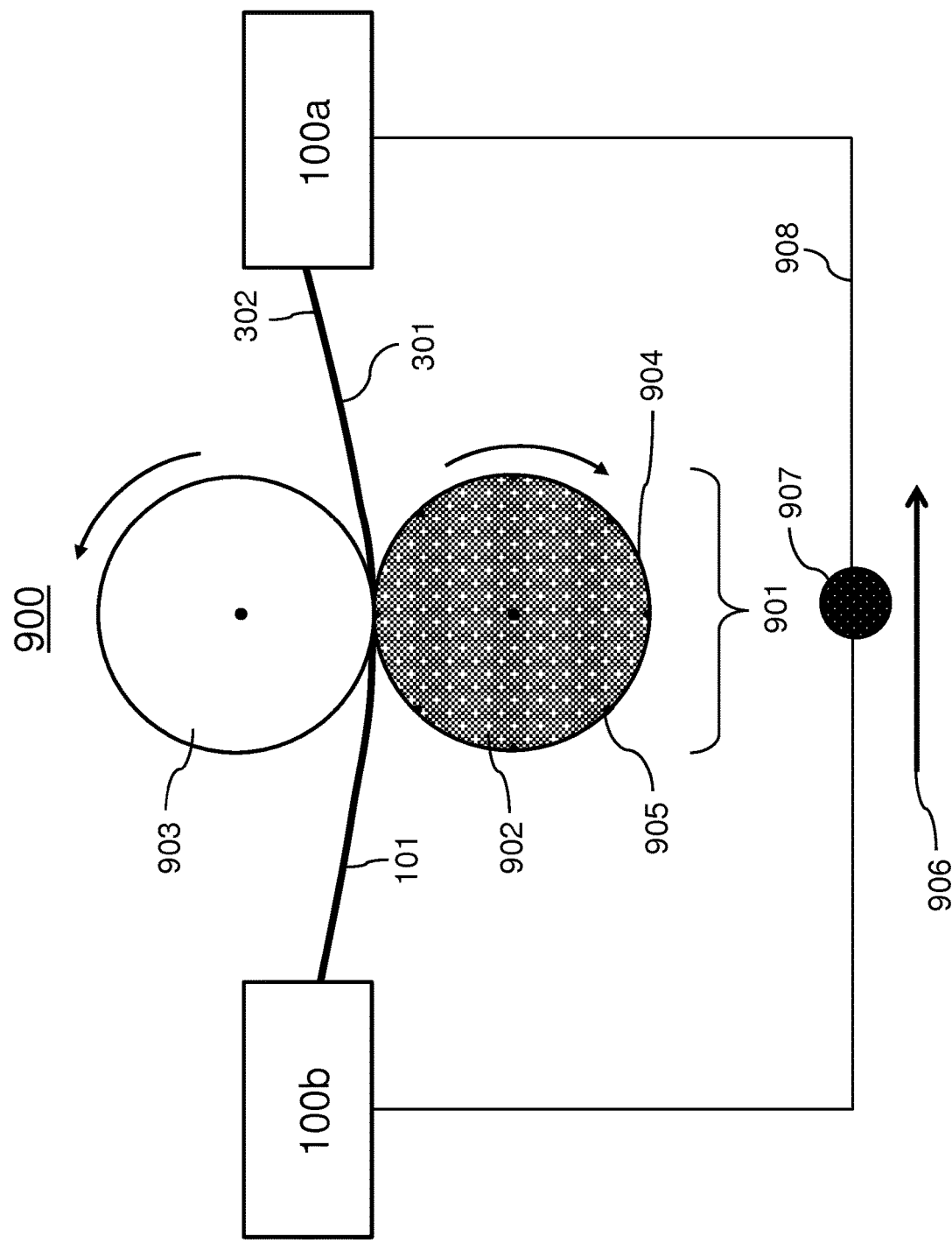
Figure 10:
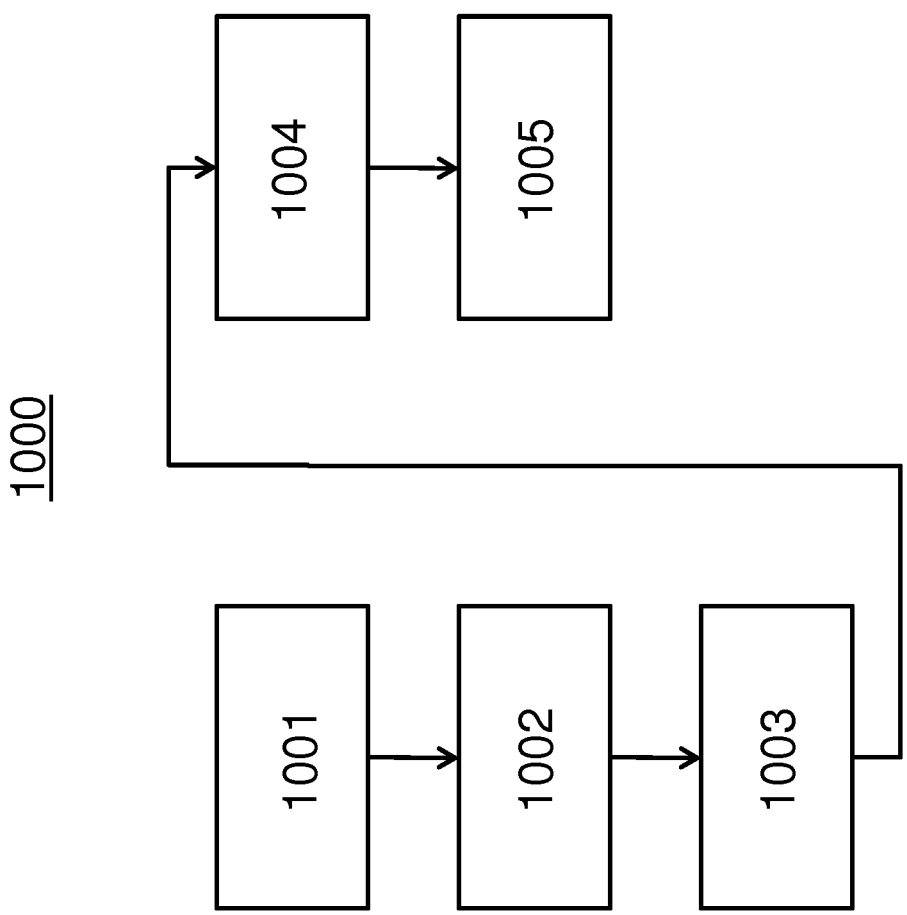
Figure 11:
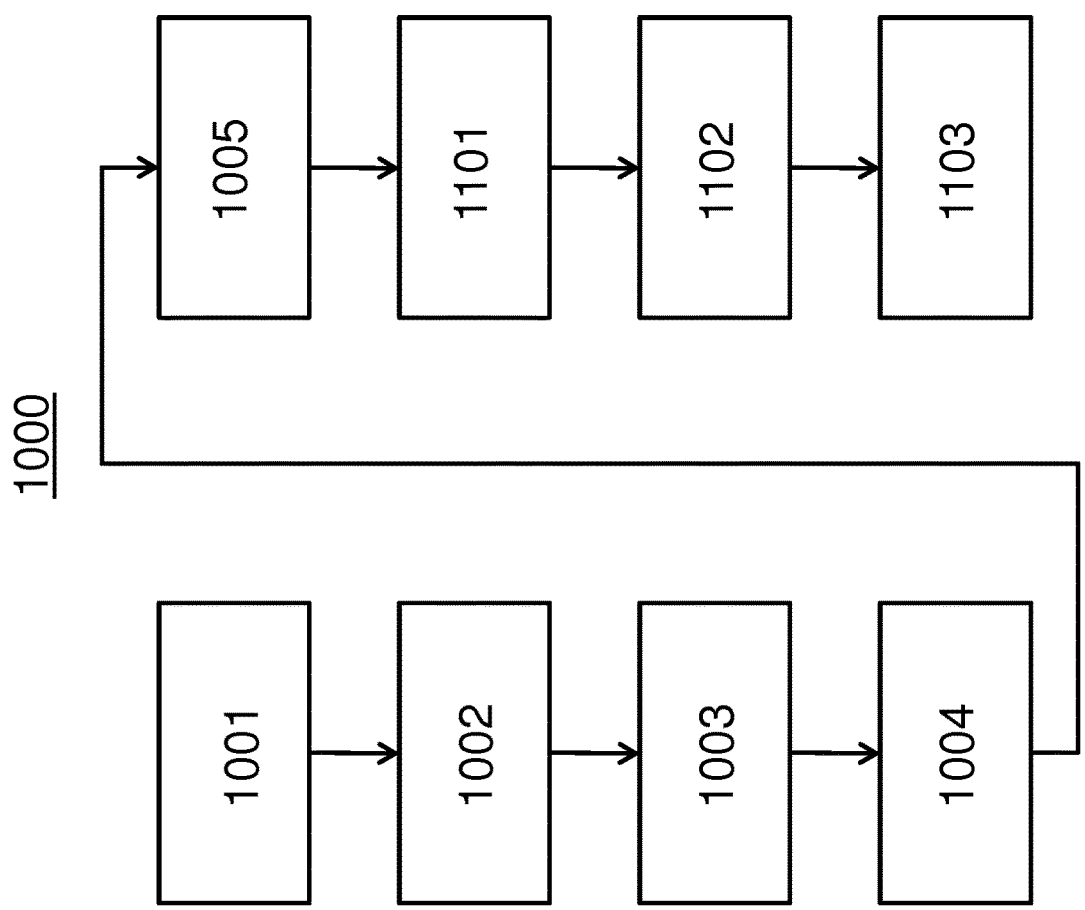
Figure 12:
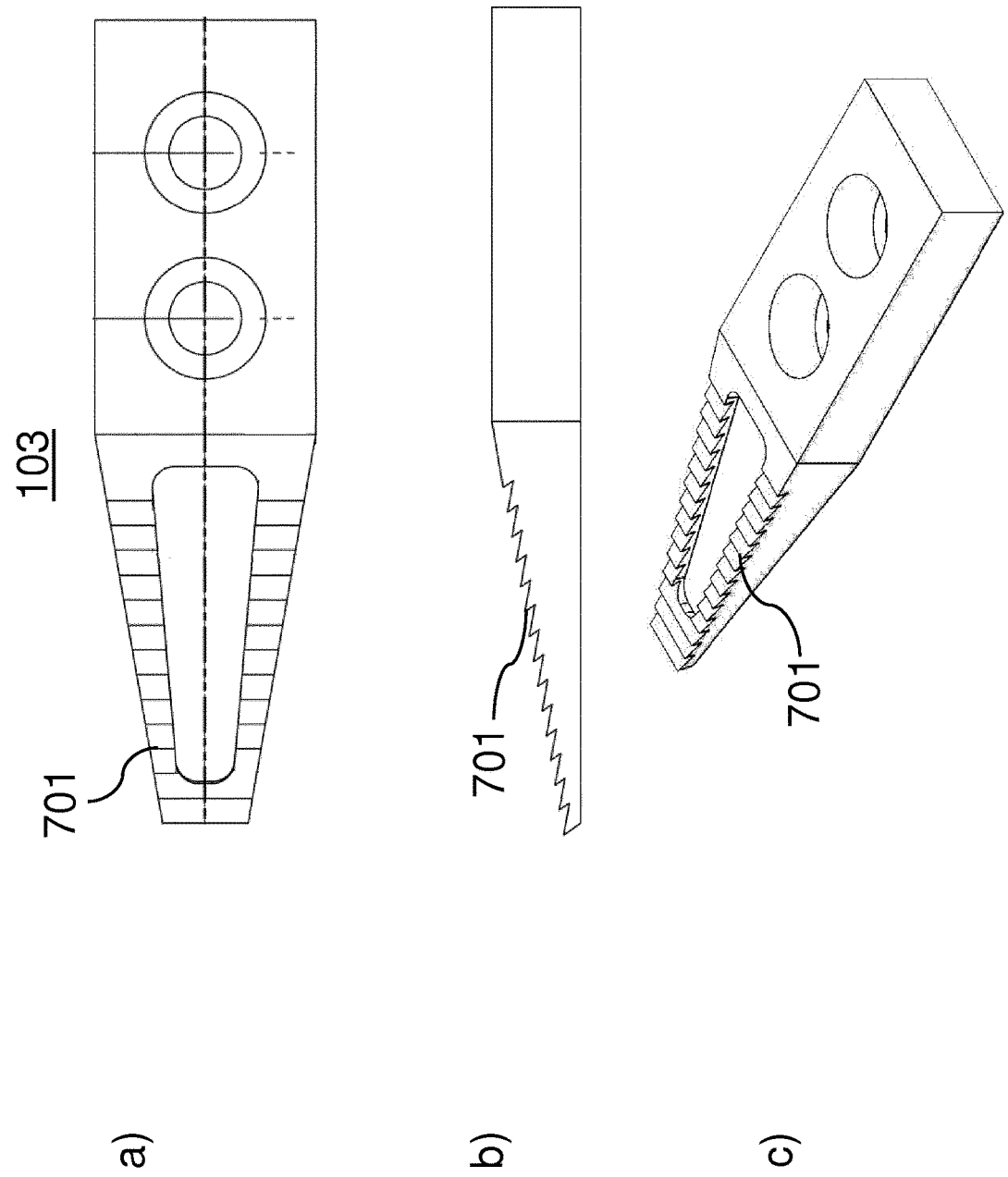

The invention is described in more detail hereinafter by examples and drawings, although the examples and drawings do not imply any restriction of the invention. Also, unless otherwise indicated, the drawings are not to scale. The figures show, in schematic form and not to scale, unless stated otherwise in the description or the respective figure:

FIG. 1 a schematic cross section of an apparatus according to the invention;

FIG. 2 a schematic cross section of a further apparatus according to the invention;

FIG. 3 a schematic cross section through a sheetlike composite;

FIG. 4 a schematic detail of a roll take-up device according to the invention;

FIG. 5 a further schematic detail of the roll take-up device according to the invention from FIG. 4;

FIG. 6 a schematic detail of a further roll take-up device according to the invention;

FIG. 7a) a schematic plan view of an electrical contact;

FIG. 7b) a schematic side view of the electrical contact from FIG. 7a);

FIG. 7c) a schematic perspective representation of the electrical contact from FIG. 7a);

FIG. 8 a schematic representation of a closed container;

FIG. 9 a schematic representation of a printing apparatus according to the invention;

FIG. 10 a flow diagram of a process according to the invention;

FIG. 11 a flow diagram of a further process according to the invention;

FIG. 12a) a schematic plan view of an electrical contact;

FIG. 12b) a schematic side view of the electrical contact from 12a); and

FIG. 12c) a schematic perspective representation of the electrical contact from FIG. 12a).

FIG. 1 shows a schematic cross section of an apparatus 100a according to the invention. The apparatus 100a comprises a roll take-up device 110, a sheetlike composite 101 and a contacting means, comprising a first electrical contact 103 and a further electrical contact 108. The first electrical contact 103 and the further electrical contact 108 are designed according to the electrical contact 103 from FIGS. 7a) to 7c). The sheetlike composite 101 is the sheetlike composite 101 from FIG. 3, wherein it has been rolled up here to form a roll 102, wherein the roll 102 is held by the roll take-up device 110. For this purpose, the roll take-up device comprises a tensioning means 104, here a tensioning cone, on which the roll 102 is mounted. In the roll 102, 100 laminas of the sheetlike composite 101 are overlaid on one another from the inside outwards, wherein the laminas respectively have the series of layers that is shown in FIG. 3. Here, the outer side 301 of each lamina on the roll 102 faces inwards. The tensioning means 104 is designed for taking up the sheetlike composite 101, which takes the form here of a rolling up of the sheetlike composite 101 to form the roll 102. For this purpose, first a tube 109 of paperboard is mounted on the tensioning cone. Here, the first electrical contact 103 and the further electrical contact 108 engage in the tube 109, in each case with a prow-shaped further cutting edge 702 on their undersides, and a multiplicity of cutting edges 701 on their upper sides are thereby positioned such that they face outwards from a lateral surface 107 of the tensioning means 104 in the manner of webs, and 2 innermost laminas of the sheetlike composite 101 that are rolled up onto the sleeve are cut into by these cutting edges 701. In this way, the electrically conductive barrier layer 306 is electrically contacted automatically during the rolling up of the sheetlike composite 101 to form the roll 102. The roll take-up device 110 also comprises a carrier element 105, which is a metal ring. This carrier element 105 is electrically insulated from the lateral surface 107, and consequently from the tensioning cone, by an insulator ring 106 of plastic. The carrier element 105 here encloses a circumference of the lateral surface 107 completely. The first electrical contact 103 and the further electrical contact 108 are in each case firmly screwed on the carrier element 105. Furthermore, the contacting means comprises a sliding contact 111, here a carbon brush, which contacts the carrier element 105 in an electrically conducting manner. An electrical voltage can be applied to the first electrical contact 103 and the further electrical contact 108 by way of the sliding contact 111, whereby the tensioning cone can rotate about its longitudinal axis for the rolling up of the sheetlike composite 101.

FIG. 2 shows a schematic cross section of a further apparatus 100b according to the invention. The apparatus 100b is designed like the apparatus 100a from FIG. 1. The first electrical contact 103 and the further electrical contact 108 from FIG. 2 are designed according to the electrical contact 103 from FIGS. 12a) to 12c). Here, too, the tensioning means 104 is designed for taking up the sheetlike composite 101, which here however takes the form of a mounting of the roll 102 of the sheetlike composite 101. On the roll 102 from FIG. 2, the outer side 301 of each lamina of the sheetlike composite 101 faces outwards on the roll 102. During the take-up, here the roll 102 is mounted on the tensioning cone with the sheetlike composite 101 rolled up on the tube 109. Here, cutting edges 701 of the first electrical contact 103 and of the further electrical contact 108 outside the tube 109 respectively cut into the innermost 2 laminas of the rolled-up sheetlike composite 101. In this way, the electrically conductive barrier layer 306 is electrically contacted automatically during the mounting of the roll 102. Here, too, an electrical voltage can be applied to the first electrical contact 103 and the further electrical contact 108 by way of the sliding contact 111, whereby the tensioning cone can rotate about its longitudinal axis for the unrolling of the sheetlike composite 101 from the roll 102.

FIG. 3 shows a schematic cross section through a sheetlike composite 101. The sheetlike composite 101 comprises, as layers overlaid on one another of a series of layers from an outer surface 301 of the sheetlike composite 101 to an inner surface 302 of the sheetlike composite 101: an outer polymer layer 303 of LDPE 19N430 from Ineos GmbH, Cologne (basis weight 15 g/m$^2$); a carrier layer 304 of a cardboard Stora Enso Natura T Duplex with a double coating (Scott bond 200 J/m$^2$, residual moisture 7.5%, basis weight 210 g/m$^2$); an intermediate polymer layer 305 of LDPE 19N430 from Ineos GmbH, Cologne (basis weight 18 g/m$^2$); a barrier layer 306 of an aluminium foil EN AW 8079 from Hydro Aluminium Deutschland GmbH (thickness 6 μm); an adhesion promoter layer 307 of Escor 6000 HSC from Exxon Mobil Corporation (basis weight 4 g/m$^2$) and LDPE 19N430 from Ineos GmbH, Cologne (basis weight 22 g/m$^2$); and an inner polymer layer 308 of a blend of 65% by weight LDPE 19N430 from Ineos GmbH, Cologne and 35% by weight Eltex 1315 AZ from Ineos GmbH, Cologne (blend basis weight 10 g/m$^2$).

FIG. 4 shows a schematic detail of the roll take-up device 110 according to the invention from FIG. 1. Here it can be seen how the tube 109 is just being pushed onto the tensioning cone.

FIG. 5 shows a further schematic detail of the roll take-up device 110 according to the invention from FIG. 4, here the tube 109 being mounted on the tensioning means 104. Prow-like further cutting edges 702 (see FIGS. 7a) to 7c)) on the undersides of the first electrical contact 103 and of the further electrical contact 108 have been cut into the tube 109. Web-like cutting edges 701 on the upper sides of the first electrical contact 103 and of the further electrical contact 108 have been positioned on the tube 109, in order to cut into the innermost 5 laminas of the sheetlike composite 101, and thereby electrically contact the barrier layer 306, during the rolling up of the sheetlike composite 101.

FIG. 6 shows a schematic detail of the roll take-up device 110 according to the invention from FIG. 2. Here, the roll 102, of which only the tube 109 is shown here, has been mounted on the tensioning means 104.

FIG. 7a) shows a schematic plan view of an electrical contact 103, 108. The electrical contact 103, 108 is formed in one piece from steel (material number 1.2767) and has 6 webs with cutting edges 701.

FIG. 7b) shows a schematic side view of the electrical contact 103, 108 from FIG. 7a).

FIG. 7c) shows a schematic perspective representation of the electrical contact 103, 108 from FIG. 7a). On its underside, the electrical contact 103, 108 has a further cutting edge 702, formed like the prow of a ship.

FIG. 8 shows a schematic representation of a closed container 800. The cuboidal closed container 800 was produced from the sheetlike composite 101 as shown in FIG. 3. The closed container 800 comprises a food or drink product 801 and has 12 edges 802.

FIG. 9 shows a schematic representation of a printing apparatus 900 according to the invention. The printing apparatus 900 comprises a first printing unit 901, comprising a first printing roller 902 and a first impression roller 903. Here, the first printing roller 902 is a gravure roller with a multiplicity of cells 905 in a printing roller surface 904. The printing apparatus 900 also comprises the sheetlike composite 101 from FIG. 3, the apparatus 100a from FIG. 1 and the apparatus 100b from FIG. 2. The roll take-up device 100b is arranged before the first printing unit 901 in a printing direction 906. The roll take-up device 100a is arranged after the first printing unit 901 in the printing direction 906. The sheetlike composite 101 is made to extend between the first printing roller 902 and the first impression roller 903. With the printing apparatus 900, the sheetlike composite 101 can be printed with a colour decoration on its outer side 301. For this purpose, the sheetlike composite 101 is unrolled from the roll 102 of the apparatus 100b, passed through the printing unit 901 and printed therein and rolled up on the tube 109 of the apparatus 100a. During the printing, the barrier layer 306 of the sheetlike composite 101 is electrically contacted both in the apparatus 100a and in the apparatus 100b by the respective first electrical contact 103 and further electrical contact 108. If the sliding contact 111 of the apparatus 100a is connected to the sliding contact 111 of the apparatus 100b in an electrically conducting manner by a power cable 908, an electrical circuit is produced. In this circuit, an electrical resistance measurement can be carried out with the aid of a commercially available multimeter 907. In the present example, the sheetlike composite 101 has a web width of 135 cm and a web length of 6200 m. Also, the barrier layer 306 of aluminium has a thickness of 6 μm. The measurement is carried out at 23° C. If in this example the electrical resistance is at most 50Ω, a continuous barrier layer 306 can be assumed. Consequently, the sheetlike composite 101 does not have any defect in the form of an adhesive join, that is to say there is no interruption of the barrier layer 306. In the case where such a defect is present, the measured electrical resistance tends towards infinity, since in this case the circuit is not closed. Consequently, by means of the construction shown in FIG. 9, a defect detection can be performed in situ during the printing of a decoration onto the sheetlike composite 101.

FIG. 10 shows a flow diagram of a process 1000 according to the invention. The process 1000 comprises a process step a) 1001: providing the sheetlike composite 101 from FIG. 3; a process step b) 1002: providing the roll take-up device 100b from FIG. 2; a process step c) 1003: mounting the roll 102 from FIG. 2 on the tensioning means 104, the electrically conductive barrier layer 306 being contacted in an electrically conducting manner by the first electrical contact 103 and the further electrical contact 108; a process step d) 1004: at least partially unrolling the sheetlike composite 101 from the roll 102; and a process step e) 1005: printing the outer side 301 of the sheetlike composite 101 with a colour decoration.

FIG. 11 shows a flow diagram of a further process 1000 according to the invention. The process 1000 comprises process steps a) to e) 1001 to 1005 of the process 1000 from FIG. 10 and moreover production of a container from the sheetlike composite 101 with the process steps i. 1101: folding the sheetlike composite 101; ii. 1102: joining regions of the sheetlike composite 101 to obtain an open container, which is filled with a food or drink product 801; and iii. 1103: closing the container to obtain the closed container 800 from FIG. 8.

FIG. 12a) shows a schematic plan view of an electrical contact 103, 108. The electrical contact 103, 108 is formed in one piece from steel (material number 1.2767) and has 15 cutting edges 701.

FIG. 12b) shows a schematic side view of the electrical contact 103, 108 from FIG. 12a).

FIG. 12c) shows a schematic perspective representation of the electrical contact 103, 108 from FIG. 12a).

LIST OF REFERENCE SIGNS

100a, Apparatus according to the invention
100b
101 Sheetlike composite
102 Roll
103 First electrical contact
104 Tensioning means
105 Carrier element
106 Insulator ring
107 Lateral surface
108 Further electrical contact
109 Tube
110 Roll take-up device according to the invention
111 Sliding contact
301 Outer side
302 Inner side
303 Outer polymer layer
304 Carrier layer
305 Intermediate polymer layer
306 Barrier layer
307 Adhesion promoter layer
308 Inner polymer layer
701 Cutting edge
702 Bevelled region
800 Closed container
801 Food or drink product
802 Edge
900 Printing apparatus according to the invention
901 First printing unit
902 First printing roller
903 First impression roller
904 Printing roller surface
905 Cells
906 Printing direction
907 Multimeter
908 Power cable
1000 Process according to the invention
1001 Process step a)
1002 Process step b)
1003 Process step c)
1004 Process step d)
1005 Process step e)
1101 Process step i)
1102 Process step ii)

1103 Process step iii)

The invention claimed is:
1. A roll take-up device, designed for
a) taking up a sheetlike composite, and
b) rolling up or unrolling or both rolling up and unrolling a roll of the sheetlike composite;
wherein the sheetlike composite comprises, as layers of a series of layers in a direction from an outer side of the sheetlike composite to an inner side of the sheetlike composite,
i) a carrier layer,
ii) a barrier layer and
iii) an inner polymer layer;
wherein, in the roll, at least 10 laminas of the sheetlike composite are overlaid on one another from the inside outwards or vice versa;
wherein the laminas respectively have the series of layers;
wherein one layer of the series of layers of the sheetlike composite is an electrically conductive layer; and
characterized in that wherein the roll take-up device comprises an electrical contact, which is arranged and designed for contacting the electrically conductive layer in an electrically conducting manner.
2. The roll take-up device according to claim 1, wherein the electrical contact is arranged and designed for contacting the electrically conductive layer in an electrically conducting manner during the take-up.
3. The roll take-up device according to claim 1, wherein the electrically conductive layer does not include the outer side or the inner side or both.
4. The roll take-up device according to claim 1, wherein the electrical contact is arranged and designed such that, for contacting the electrically conductive layer in an electrically conducting manner, it the electrical contact at least partially cuts or perforates or both cuts and perforates at least one lamina of the sheetlike composite.
5. The roll take-up device according to claim 1, wherein the electrical contact comprises at least one cutting edge.
6. The roll take-up device according to claim 1, wherein the roll take-up device comprises a tensioning means or a rotation shaft or both;
wherein the tensioning means or the rotation shaft or both is/are designed for
a) taking up the sheetlike composite, and
b) rolling up or unrolling or both rolling up and unrolling the roll of the sheetlike composite;
wherein the tensioning means or the rotation shaft or both include(s) a lateral surface and the electrical contact.
7. The roll take-up device according to claim 6, wherein the roll take-up device also comprises a carrier element,
wherein the carrier element
a) at least partially surrounds the lateral surface along a circumference of the lateral surface, and
b) is electrically insulated from the lateral surface,
wherein the electrical contact is fixed on the carrier element.
8. The roll take-up device according to claim 1, wherein the barrier layer is the electrically conductive layer.
9. An apparatus, comprising
a) a roll take-up device
a sheetlike composite and
c) a contacting means;
wherein the sheetlike composite comprises, as layers of a series of layers in a direction from an outer side of the sheetlike composite to an inner side of the sheetlike composite,
a. a carrier layer,
b. a barrier layer and
c. an inner polymer layer;
wherein the sheetlike composite is at least partially rolled up to form a roll,
wherein the roll is held by the roll take-up device;
wherein, in the roll, at least 10 laminas of the sheetlike composite are overlaid on one another from the inside outwards or vice versa;
wherein the laminas respectively have the series of layers;
wherein one layer of the series of layers of the sheetlike composite is an electrically conductive layer; and
wherein the contacting means is contacted with the electrically conductive layer in an electrically conducting manner.
10. The apparatus according to claim 9, wherein the electrically conductive layer does not include the outer side or the inner side or both.
11. The apparatus according to claim 9, wherein the contacting means comprises an electrical contact,
wherein the electrical contact at least partially cuts or perforates or both cuts and perforates at least one lamina of the sheetlike composite.
12. The apparatus according to claim 9, wherein the contacting means comprises an electrical contact,
wherein the electrical contact comprises at least one cutting edge.
13. The apparatus according to claim 9, wherein the roll take-up device comprises a tensioning means or a rotation shaft or both,
wherein the tensioning means or the rotation shaft or both include(s) a lateral surface.
14. The apparatus according to claim 13, wherein the roll take-up device also comprises a carrier element,
wherein the carrier element
a) at least partially surrounds the lateral surface along a circumference of the lateral surface, and
b) is electrically insulated from the lateral surface,
wherein the electrical contact is fixed on the carrier element.
15. The apparatus according to claim 9, wherein the barrier layer is the electrically conductive layer.
16. A printing apparatus, comprising
a) a first printing unit, comprising a first printing roller and a first impression roller,
b) a sheetlike composite,
c) a first contacting means,
wherein the sheetlike composite
A) comprises, as layers of a series of layers in a direction from an outer side of the sheetlike composite to an inner side of the sheetlike composite,
i) a carrier layer,
ii) a barrier layer and
iii) an inner polymer layer,
and
B) is partly made to extend between the first printing roller and the first impression roller,
wherein one layer of the series of layers of the sheetlike composite is an electrically conductive layer, and
wherein the first contacting means contacts the electrically conductive layer in an electrically conducting manner.
17. A process, comprising as process steps
a) providing a sheetlike composite comprising, as layers of a series of layers in a direction from an outer side of the sheetlike composite to an inner side of the sheetlike composite, i) a carrier layer,
ii) a barrier layer and
iii) an inner polymer layer;
b) providing a first roll take-up device, comprising a first electrical contact,
c) taking up the sheetlike composite by the first roll take-up device,
wherein one layer of the series of layers of the sheetlike composite is an electrically conductive layer, and
wherein, in process step c), the electrically conductive layer is contacted with the first electrical contact in an electrically conducting manner.

18. A process for detecting a defect of the electrically conductive layer using the roll take-up device according to claim 1 for detecting a defect of the electrically conductive layer.

19. A process for printing onto the sheetlike composite using the roll take-up device according to claim 1 when printing onto the sheetlike composite.

20. A process for taking up a sheetlike composite,
wherein the sheetlike composite comprises, as layers of a series of layers in a direction from an outer side of the sheetlike composite to an inner side of the sheetlike composite,
i) a carrier layer,
ii) a barrier layer, and
iii) an inner polymer layer,
wherein one layer of the series of layers of the sheetlike composite is an electrically conductive layer, and
wherein, in the take-up, the electrically conductive layer is contacted with an electrical contact comprised by the tensioning means in an electrically conducting manner.

\* \* \* \* \*